United States Patent
Noh et al.

(10) Patent No.: US 10,833,570 B2
(45) Date of Patent: Nov. 10, 2020

(54) HOMOPOLAR BEARINGLESS SLICE MOTORS

(71) Applicant: Massachusetts Institute of Technology, Cambridge, MA (US)

(72) Inventors: Minkyun Noh, Cambridge, MA (US); David L. Trumper, Plaistow, NH (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/204,042

(22) Filed: Nov. 29, 2018

(65) Prior Publication Data

US 2019/0199186 A1    Jun. 27, 2019

Related U.S. Application Data

(60) Provisional application No. 62/718,478, filed on Aug. 14, 2018, provisional application No. 62/609,711, filed on Dec. 22, 2017.

(51) Int. Cl.
*H02K 7/09* (2006.01)
*H02K 21/20* (2006.01)
(Continued)

(52) U.S. Cl.
CPC ............ *H02K 21/20* (2013.01); *H02K 1/17* (2013.01); *H02K 1/246* (2013.01); *H02K 11/215* (2016.01);
(Continued)

(58) Field of Classification Search
CPC .. H02K 1/09; H02K 1/17; H02K 1/22; H02K 1/24; H02K 1/246; H02K 21/20;
(Continued)

(56) References Cited

U.S. PATENT DOCUMENTS 3,467,844 A    9/1969    Bird
3,694,041 A    9/1972    Studer
(Continued)

FOREIGN PATENT DOCUMENTS

CN    103501064 A    1/2014
JP    S 5883563 A    5/1983
(Continued)

OTHER PUBLICATIONS

Gruber, et al.; "Design of a Novel Homopolar Bearingless Slice Motor With Reluctance Rotor"; IEEE Transactions on Industry Applications; vol. 51; No. 2; Mar./Apr. 2015; pp. 1456-1464; 9 Pages.
(Continued)

*Primary Examiner* — Tran N Nguyen
(74) *Attorney, Agent, or Firm* — Daly, Crowley, Mofford & Durkee LLP

(57) ABSTRACT

Described are homopolar bearingless slice motors which include an array arrangement of permanent magnets on stator teeth, and a magnet-free rotor having a unique surface geometry. Also described are related components of such motors. The permanent magnet arrays provide homopolar bias flux to the rotor, and salient features on the rotor surface route the bias flux toward paths desirable for force and torque generation. In an illustrative embodiment, two magnet arrays are placed at the tips of stator teeth, so as to provide the bias flux via relatively short flux paths. By modulating current through windings based upon the rotor radial and angular position measurements, the stator can levitate and rotate the rotor.

22 Claims, 19 Drawing Sheets

(51) Int. Cl.
*H02K 1/24* (2006.01)
*H02K 1/17* (2006.01)
*H02K 11/215* (2016.01)
*H02K 19/10* (2006.01)
*H02K 21/44* (2006.01)

(52) U.S. Cl.
CPC ........... *H02K 19/103* (2013.01); *H02K 21/44* (2013.01); *H02K 7/09* (2013.01)

(58) Field of Classification Search
CPC ........ H02K 21/38; H02K 21/44; H02K 11/00; H02K 11/21; H02K 11/215; H02K 19/00; H02K 19/10; H02K 19/103; H02K 29/00; H02K 29/08; H02K 7/00; H02K 7/09; B01F 13/0872; F16C 32/04; F16C 32/044; F16C 32/0446; F16C 32/045; F16C 32/0457; F16C 32/046; F16C 32/0461; F16C 32/0465; F16C 32/048; F16C 32/0485; F16C 32/049; F16C 32/0497; A61M 1/00; A61M 1/10; A61M 1/101; A61M 1/1015; A61M 1/1031
See application file for complete search history.

(56) References Cited

U.S. PATENT DOCUMENTS

| | | |
|---|---|---|
| 3,865,442 A | 2/1975 | Studer |
| 3,891,879 A | 6/1975 | Yamada et al. |
| 4,000,929 A | 1/1977 | Studer |
| 4,072,370 A | 2/1978 | Wasson |
| 4,077,678 A | 3/1978 | Studer et al. |
| 4,381,875 A | 5/1983 | Studer |
| 4,387,935 A | 6/1983 | Studer |
| 4,454,438 A | 6/1984 | Yamashita et al. |
| 4,634,191 A | 1/1987 | Studer |
| 4,639,353 A | 1/1987 | Takemura et al. |
| 4,841,204 A | 6/1989 | Studer |
| 4,885,489 A | 12/1989 | Stuhr |
| 4,975,247 A | 12/1990 | Badolato et al. |
| 5,142,932 A | 9/1992 | Moya et al. |
| 5,187,401 A | 2/1993 | Rahman |
| 5,205,721 A | 4/1993 | Isaacson |
| 5,217,689 A | 6/1993 | Raible |
| 5,263,924 A | 11/1993 | Mathewson |
| 5,266,265 A | 11/1993 | Raible |
| 5,270,005 A | 12/1993 | Raible |
| 5,429,486 A | 7/1995 | Schock et al. |
| 5,581,139 A | 12/1996 | Toukola |
| 5,695,471 A | 12/1997 | Wampler |
| 5,708,346 A | 1/1998 | Schob |
| 5,758,709 A | 6/1998 | Boyd, Jr. |
| 5,770,149 A | 6/1998 | Raible |
| 5,830,370 A | 11/1998 | Maloney, Jr. et al. |
| 5,844,339 A | 12/1998 | Schroeder et al. |
| 5,939,813 A | 8/1999 | Schob |
| 6,015,272 A | 1/2000 | Antaki et al. |
| 6,029,336 A | 2/2000 | Kliman et al. |
| 6,053,705 A | 4/2000 | Schob et al. |
| 6,078,119 A | 6/2000 | Satoh et al. |
| 6,130,494 A | 10/2000 | Schob |
| 6,171,078 B1 | 1/2001 | Schöb |
| 6,175,178 B1 | 1/2001 | Tupper et al. |
| 6,181,040 B1 | 1/2001 | Schob |
| 6,220,832 B1 | 4/2001 | Schöb |
| 6,222,290 B1 | 4/2001 | Schob et al. |
| 6,227,817 B1 | 5/2001 | Paden |
| 6,234,772 B1 | 5/2001 | Wampler et al. |
| 6,244,835 B1 | 6/2001 | Antaki et al. |
| 6,278,251 B1 | 8/2001 | Schob |
| 6,297,574 B1 | 10/2001 | Schob et al. |
| 6,351,048 B1 | 2/2002 | Schob et al. |
| 6,359,357 B1 | 3/2002 | Blumenstock |
| 6,365,996 B2 | 4/2002 | Schob |
| 6,394,769 B1 | 5/2002 | Bearnson et al. |
| 6,447,265 B1 | 9/2002 | Antaki et al. |
| 6,447,266 B2 | 9/2002 | Antaki et al. |
| 6,503,450 B1 | 1/2003 | Afzal et al. |
| 6,559,567 B2 | 5/2003 | Schob |
| 6,575,717 B2 | 6/2003 | Ozaki et al. |
| 6,580,546 B2 | 6/2003 | Liu et al. |
| 6,640,617 B2 | 11/2003 | Schob et al. |
| 6,688,861 B2 | 2/2004 | Wampler |
| 6,723,284 B1 | 4/2004 | Reeder et al. |
| 6,730,267 B2 | 5/2004 | Stringer et al. |
| 6,733,171 B2 | 5/2004 | Schob |
| 6,864,084 B2 | 3/2005 | Schöb |
| 6,879,074 B2 | 4/2005 | Amrhein et al. |
| 6,898,984 B2 | 5/2005 | Schob |
| 6,929,777 B1 | 8/2005 | Litwak et al. |
| 6,963,222 B1 | 11/2005 | Davies, Jr. |
| 7,112,903 B1 | 9/2006 | Schob |
| 7,467,930 B2 | 12/2008 | Ozaki et al. |
| 7,470,246 B2 | 12/2008 | Mori et al. |
| 7,525,229 B1 | 4/2009 | Willig et al. |
| 7,682,301 B2 | 3/2010 | Wampler et al. |
| 7,683,514 B2 | 3/2010 | Onuma et al. |
| 7,719,151 B2 | 5/2010 | Tremaudant et al. |
| 7,859,156 B2 | 12/2010 | Nusser et al. |
| 7,927,544 B2 | 4/2011 | Federspiel et al. |
| 7,934,909 B2 | 5/2011 | Nuesser et al. |
| 7,963,228 B2 | 6/2011 | Studer |
| 7,977,838 B2 | 7/2011 | Onuma |
| 8,004,137 B2 | 8/2011 | Studer |
| 8,226,373 B2 | 7/2012 | Yaegashi |
| 8,282,269 B2 | 10/2012 | Terentiev |
| 8,288,906 B2 | 10/2012 | Onuma |
| 8,366,599 B2 | 2/2013 | Tansley et al. |
| 8,430,652 B2 | 4/2013 | Yaegashi et al. |
| 8,471,425 B2 | 6/2013 | Petro et al. |
| 8,496,874 B2 | 7/2013 | Gellman et al. |
| 8,581,462 B2 | 11/2013 | Nussbaumer |
| 8,581,559 B2 | 11/2013 | Botts |
| 8,668,473 B2 | 3/2014 | LaRose et al. |
| 8,747,293 B2 | 6/2014 | Arndt et al. |
| 8,807,968 B2 | 8/2014 | Wampler et al. |
| 8,834,342 B2 | 9/2014 | Wampler et al. |
| 9,211,369 B2 | 12/2015 | Gartner et al. |
| 9,835,158 B2 | 12/2017 | Schöb |
| 2002/0057989 A1 | 5/2002 | Afzal et al. |
| 2002/0094281 A1 | 7/2002 | Khanwilkar et al. |
| 2004/0062239 A1 | 4/2004 | Seo et al. |
| 2004/0219059 A1 | 11/2004 | Barringer et al. |
| 2005/0135942 A1 | 6/2005 | Wood et al. |
| 2005/0135948 A1 | 6/2005 | Olsen et al. |
| 2007/0193635 A1 | 8/2007 | Hahn et al. |
| 2007/0216251 A1 | 9/2007 | Shim et al. |
| 2007/0249888 A1 | 10/2007 | Wu et al. |
| 2008/0190870 A1 | 8/2008 | Schoeb |
| 2008/0199357 A1 | 8/2008 | Gellman et al. |
| 2009/0041595 A1 | 2/2009 | Garzaniti et al. |
| 2009/0121571 A1* | 5/2009 | Onuma .................. F04D 29/058 310/90.5 |
| 2009/0175762 A1 | 7/2009 | Ogihara et al. |
| 2010/0101657 A1 | 4/2010 | Morley et al. |
| 2010/0101879 A1 | 4/2010 | McVickers |
| 2010/0172775 A1* | 7/2010 | Onuma .................. F04D 13/06 417/423.7 |
| 2010/0231076 A1* | 9/2010 | Chiba .................. F16O 32/0459 310/90.5 |
| 2010/0288703 A1 | 11/2010 | Fortenberry |
| 2011/0025154 A1* | 2/2011 | Nussbaumer ........ H02K 1/2786 310/90.5 |
| 2011/0237863 A1 | 9/2011 | Ricci et al. |
| 2013/0022481 A1 | 1/2013 | Schöb et al. |
| 2013/0164161 A1 | 6/2013 | Schöb |
| 2013/0330219 A1 | 12/2013 | LaRose et al. |
| 2013/0343927 A1 | 12/2013 | Ramdane et al. |
| 2013/0343954 A1 | 12/2013 | Gartner et al. |
| 2014/0023534 A1 | 1/2014 | Ramdane et al. |
| 2014/0046118 A1 | 2/2014 | LaRose et al. |
| 2014/0062239 A1* | 3/2014 | Schoeb .................... H02K 7/09 310/90.5 |

(56) References Cited

U.S. PATENT DOCUMENTS

| | | | |
|---|---|---|---|
| 2014/0171727 | A1 | 6/2014 | Nusser et al. |
| 2014/0179983 | A1 | 6/2014 | LaRose et al. |
| 2014/0187852 | A1 | 7/2014 | Peters et al. |
| 2014/0199179 | A1 | 7/2014 | Da Silva et al. |
| 2014/0205434 | A1 | 7/2014 | Graichen |
| 2014/0252899 | A1 | 9/2014 | Looser |
| 2014/0252900 | A1* | 9/2014 | Mandes .................. H02K 21/36 310/154.29 |
| 2015/0352265 | A1 | 12/2015 | Garimella et al. |
| 2017/0007973 | A1* | 1/2017 | Schob .................. F16C 32/0497 |
| 2017/0040868 | A1* | 2/2017 | Noh ...................... F04D 13/064 |
| 2019/0125946 | A1 | 5/2019 | Gartner et al. |

FOREIGN PATENT DOCUMENTS

| | | | |
|---|---|---|---|
| JP | H 04235724 | A | 8/1992 |
| RU | 2013/139210 | A | 2/2015 |
| WO | WO 2007/140504 | A1 | 12/2007 |
| WO | WO 2017/024119 | A1 | 2/2017 |
| WO | WO 2017/218987 | A1 | 12/2017 |

OTHER PUBLICATIONS

Gruber, et al.; "Modeling and Realization of a Bearingless Flux-Switching Slice Motor"; MDPI; Actuators 2017, 6, 12; Mar. 27, 2017; 18 Pages.
International Search Report and Written Opinion of the ISA dated Feb. 8, 2019 for International Application No. PCT/US2018/062990;11 Pages.
Gruber, et al.; "Modeling and Realization of a Bearlingless Flux-Switching Slice Motor;" Actuators; 2017; www.mdpi.com/journal/actuators; Mar. 27, 2017; 18 pages.
PCT International Search Report of the ISA for PCT No. PCT/US2018/062990; dated Feb. 8, 2019; 3 pages.
PCT Written Opinion of the ISA for PCT No. PCT/US2018/062990; dated Feb. 8, 2019; 5 pages.
Asama et al., "Development of a Compact Centrifugal Pump With a Two-Axis Actively Positioned Consequent-Pole Bearingless Motor;" Proceedings of IEEE Transactions on Industry Applications, vol. 50, No. 1; Jan./Feb. 2014; pp. 288-295; 8 Pages.
Asama et al., "Reduction of Force Interference and Performance Improvement of a Consequent-Pole Bearingless Motor;" Precision Engineering, vol. 36, No. 1; Jan. 2012; pp. 10-18; 9 Pages.
Barletta et al., "Design of a Bearingless Blood Pump;" Proceedings of 3$^{rd}$ International Symposium on Magnetic Suspension Technology, Part 1; Jul. 1996; pp. 265-274; 10 Pages.
Gruber et al., "Design of a Novel Homopolar Bearingless Slice Motor with Reluctance Rotor;" Proceedings of IEEE Transactions on Industry Applications, vol. 51, No. 2; Mar./Apr. 2015; pp. 1456-1464; 9 Pages.
Noh et al., "Homopolar-biased Hysteresis Bearingless Slice Motors;" Proceedings of 15$^{th}$ International Symposium on Magnetic Bearings; Aug. 3, 2016; 5 Pages.
Noh et al., "Hysteresis Bearingless Slice Motors with Homopolar Flux-biasing;" Proceedings of IEEE/ASME Transactions on Mechatronics, vol. 22, No. 5; Feb. 2017; pp. 2308-2318; 11 Pages.
Puentener et al., "Homopolar Bearingless Slice Motor in Temple Design;" Proceedings of IEEE International Electric Machines & Drives Conference (IEMDC); May 2017; 7 Pages.
Rao et al., "A Bearingless Motor Utilizing a Permanent Magnet Free Structure for Disposable Centrifugal Blood Pumps;" Journal of Advanced Mechanical Design, Systems, and Manufacturing, vol. 9, No. 3; Feb. 2015; 16 Pages.
Schoeb et al., "Principle and Application of a Bearingless Slice Motor;" JSME International Journal, Series C, vol. 40, No. 4; Jan. 1997; 6 Pages.
U.S. Notice of Allowance dated Nov. 14, 2018 for U.S. Appl. No. 15/227,256; 11 Pages.

Allaire, et al.; "Blood Flow in a Continuous Flow Ventricular Assist Device;" Artificial Organs; 23(8); Blackwell Science, Inc.; International Society for Artificial Organs; Aug. 1999; pp. 769-773; 5 pages.
Allaire, et al.; "Low Power Magnetic Bearing Design for High Speed Rotating Machinery;" International Symposium on Magnetic Suspension Technology (1992); Part 1; pp. 317-329; 12 pages.
AlOmari, et al.; "Developments in Control Systems for Rotary Left Ventricular Assist Devices for Heart Failure Patients; a Review;" IOP Publishing; Physiological Measurement; vol. 1; Jan. 2013; pp. R1-R27; 28 pages.
Ammar, et al.; "The ABCs of Left Ventricular Assist Device Echocardiography: a Systematic Approach;" European Heart Journal—Cardiovascular Imaging; May 10, 2012; 15 pages.
Baumgartner et al.; "Multivariable State Feedback Control of a 500 000 rpm Self-Bearing Motor;" IEEE International Electric Machines Drives Conference (IEMDC) 2013; pp. 347-353; 7 pages.
Baumgartner, et al.; "Novel High-Speed, Lorentz-Type, Slotless Self-Bearing Motor;" IEEE Energy Conversion Congress & Exposition (ECCE); 2010; pp. 3971-3977; 7 pages.
Bearnson, et al.; "HeartQuest Ventricular Assist Device Magnetically Levitated Centrifugal Blood Pump;" Artificial Organs; International Center for Artificial Organs and Transplantation; vol. 30; No. 5; 2006; pp. 339-346; 8 pages.
Bichsel; "The Bearingless Electrical Machine;" Nasa Langley Research Center; International Symposium on Magnetic Suspension Technology; Part 2; N92-27793; 1992; pp. 561-573; 12 pages.
Bourque, et al.; "HeartMate III: Pump Design for a Centrifugal LVAD with a Magnetically Levitated Rotor;" ASAIO Journal 2001; pp. 401-405; 5 pages.
Chen, et al.; "A Magnetic Suspension Theory and It's Application to the HeartQuest Ventricular Assist Device;" Artificial Organs; International Society for Artificial Organs; vol. 26; No. 11; 2002; pp. 947-951; 5 pages.
Chiba, et al.; "Radial Force in a Bearingless Reluctance Motor;" IEEE Transactions on Magnetics; vol. 27; No. 2; Mar. 1991; pp. 786-790; 5 pages.
Copeland, et al.; "An Analysis of the Hysteresis Motor I—Analysis of the Idealized Machine;" IEEE Transactions on Power Apparatus and Systems; vol. 82; No. 65; Apr. 1963; pp. 34-42; 9 pages.
Copeland, et al.; "An Analysis of the Hysteresis Motor II—The Circumferential-Flux Machine;" IEEE Transactions on Power Apparatus and Systems; vol. 83; No. 6; pp. 619-625; Jun. 1964; 7 pages.
Esmore, et al.; "VentrAssist™ Left Ventricular Assist Device: Clinical Trial Results and Clinical Development Plan Update;" European Journal of Cardio-Thoracic Surgery; vol. 32; No. 5; Nov. 2007; pp. 735-744; 10 pages.
Farrar, et al.; "Design Features, Developmental Status, and Experimental Results with the Heartmate III Centrifugal Left Ventricular Assist System with a Magnetically Levitated Rotor;" ASAIO Journal 2007; vol. 53; No. 3; May 2007; pp. 310-315; 6 pages.
Goldowsky; "Magnevad—The World's Smallest Magnetic-bearing Turbo Pump;" Artificial Organs; International Center for Artificial Organs and Transplantation; vol. 28; No. 10; 2004; 8 pages.
Goldowsky, et al.; "Magnevad Status of Design Improvements Human Blood Results and Preliminary Sheep Trial;" Artificial Organs; vol. 29; No. 10; 2005; pp. 855-857; 6 pages.
Grochmal, et al.; "Control of a Self-Bearing Servomotor;" IEEE Control Systems Magazine; vol. 29; No. 5; Oct. 2009; pp. 74-92; 19 pages.
Gruber, et al.; "Bearingless Slice Motor Concepts without Permanent Magnets in the Rotor;" IEEE International Conference on Industrial Technology (ICIT); 2013; pp. 259-265; 7 pages.
Gruber; "Bearingless Slice Motors: General Overview and the Special Case of Novel Magnet-Free Rotors;" Innovative Small Drivers and Micro-Motor Systems; GMM/ETG Symposium; Sep. 19-20, 2013; pp. 116-121; 6 pages.
Gruber, et al.; "Design of a Bearingless Flux-Switching Slice Motor;" The 2014 International Power Electronics Conference; 2014; pp. 1691-1696; 6 pages.
Hassani, et al.; "A Survey on Hysteresis Modeling, Identification and Control;" Mechanical Systems and Signal Processing 49; Dec. 2014; pp. 209-233; 25 pages.

(56) References Cited

OTHER PUBLICATIONS

Hetzer, et al.; "First Experiences with a Novel Magnetically Suspended Axial Flow Left Ventricular Assist Device;" European Journal of Cardio-Thoracic Surgery; vol. 25; No. 6; Jun. 2004; 7 pages.
Hoshi, et al.; "Third-Generation Blood Pumps with Mechanical Noncontact Magnetic Bearings;" Artificial Organs; International Center for Artificial Organs and Transplantation; vol. 30; No. 5; 2006; 15 pages.
Ichikawa, et al.; "Inherently Decoupled Magnetic Suspension in Homopolar-Type Bearingless Motors;" IEEE Transactions on Industry Applications; vol. 37; No. 6; Nov./Dec. 2001; 7 pages.
Imoberdorf, et al.; "Combined Radial-Axial Magnetic Bearing for a 1kW, 500,000 rpm Permanent Magnet Machine;" APEC 2007; Twenty Second Annual IEEE Applied Power Electronics Conference; 2007; pp. 1434-1400; 7 pages.
Kafagy, et al.; "Axial Flow Artificial Heart Blood Pumps: A Brief Review;" Trends Biomater; vol. 27; No. 3; Jul. 2013; pp. 124-130; 8 pages.
Kanebako, et al.; "New Design of Hybrid-Type Self-Bearing Motor for Small, High-Speed Spindle;" IEEE/ASME Transactions on Mechatronics; vol. 8; No. 1; Mar. 2003; pp. 111-119; 9 pages.
Kashiwa, et al.; "Left Heart Bypass Support with the Rotaflow Centrifugal Pump as a Bridge to Decision and Recovery in an Adult;" Artificial Organs; vol. 15; No. 2; Jun. 2012; pp. 207-210 (4 pages).
Kuwajima, et al.; "An Estimation of the Rotor Displacements of Bearingless Motors Based on a High Frequency Equivalent Circuit;" 2001 $4^{th}$ IEEE Int'l Conference on Power Electronics and Drive Systems 2001 Proceedings; vol. 2; pp. 725-731; 7 pages.
Kyo, et al.; "New Era for Therapeutic Strategy for Heart Failure: Destination Therapy by Left Ventricular Assist Device;" Journal of Cardiology; vol. 59; No. 2; Mar. 2012; pp. 101-109; 9 pages.
LaRose, et al.; "Design Concepts and Principle of Operation of the HeartWare Ventricular Assist System;" ASAIO Journal 2010; Jun. 2010; pp. 285-289; 5 pages.
Loforte, et al.; "Levitronix CentriMag Third-Generation Magnetically Levitated Continuous Flow Pump as Bridge to Solution;" ASAIO Journal 2011; Adult Circulatory Support; vol. 57; No. 4; Jul. 2011; 7 pages.
Loree, II, et al.; "The HeartMate III: Design and In Vivo Studies of a Maglev Centrifugal Left Ventricular Assist Device;" Artificial Organs; International Society for Artificial Organs; vol. 25; No. 5; May 2001; pp. 386-391; 6 pages.
Maslen, et al.; "Magnetic Bearing Design for Reduced Power Consumption;" Journal of Tribology; ASME; vol. 118; Oct. 1996; pp. 839-846; 8 pages.
Melcher; "Continuum Electromechanics;" Massachusetts Institute of Technology; The MIT Press; Jun. 29, 1981; Part 1 of 2; 320 pages.
Melcher; "Continuum Electromechanics;" Massachusetts Institute of Technology; The MIT Press; Jun. 29, 1981; Part 2 of 2; 307 pages.
Moazami, et al.; "Axial and Centrifugal Continuous-Flow Rotary Pumps: A Translation from Pump Mechanics to Clinical Practice;" The Journal of Heart and Lunch Transplantation; vol. 32; No. 1; pp. 1-11; Jan. 2013; pp. 1-11; 11 pages.
Morita, et al.; "Improvement of Position-Sensing Characteristics in Self-Sensing Active Magnetic Bearings;" 2005 European Conference on Power Electronics and Applications; 2005; pp. 1-8; 8 pages.
Nejad, et al.; "Hysteresis Self-Bearing Motor;" ISMB14; $14^{th}$ International Symposium on Magnetic Bearings; Aug. 11-14, 2014; pp. 737-742; 6 pages.
Nejad, "Self-Bearing Motor Design & Control;" Massachusetts Institute of Technology; Department of Mechanical Engineering; Thesis; Jan. 15, 2013; Part 1 of 3; 100 pages.
Nejad, "Self-Bearing Motor Design & Control;" Massachusetts Institute of Technology; Department of Mechanical Engineering; Thesis; Jan. 15, 2013; Part 2 of 3; 100 pages.
Nejad, "Self-Bearing Motor Design & Control;" Massachusetts Institute of Technology; Department of Mechanical Engineering; Thesis; Jan. 15, 2013; Part 3 of 3; 68 pages.
Nitao, et al.; "Equivalent Circuit Modeling of Hysteresis Motors;" Lawrence Livermore National Laboratory (LLNL-TR-416493); Jul. 21, 2009; 57 pages.
Pagani; "Continuous-Flow Rotary Left Ventricular Assist Devices with "$3^{rd}$ Generation" Design;" Thoracic and Cardiovascular Surgery; WBS; vol. 20; No. 3; 2008; pp. 255-263; 9 pages.
Patel, et al.; "A Contemporary Review of Mechanical Circulatory Support;" The Journal of Heart and Lung Transplantation; vol. 33; No. 7; Jul. 2014; pp. 667-674; 8 pages.
Radman, et al.; "Control Design of a Bearingless Flux-Switching Slice Drive;" Proceedings of the $6^{th}$ European Embedded Design in Education and Research (EDERC); 2014; pp. 197-201; 5 pages.
Rahman, et al.; "A Permanent Magnet Hysteresis Hybrid Synchronous Motor for Electric Vehicles;" IEEE Transactions on Industrial Electronics; vol. 44; No. 1; Feb. 1997; pp. 46-53; 8 pages.
Rahman, et al.; "Dynamic Performance Prediction of Hysteresis Motors;" Conference Record of the 1989 IEEE Industrial Applications Society Annual Meeting; 1989; vol. 1; pp. 278-284; 7 pages.
Rahman, et al.; "Steady-State Performance Analysis of Polyphase Hysteresis-Reluctance Motors;" IEEE Transactions on Industry Applications; vol. IA-21; No. 4; May/Jun. 1985; pp. 659-663; 5 pages.
Ritter; "Analysis and Design of a Two-Axis Noncontact Position Sensor;" Massachusetts Institute of Technology; Thesis; Feb. 1999; Part 1 of 2; 85 pages.
Ritter; "Analysis and Design of a Two-Axis Noncontact Position Sensor;" Massachusetts Institute of Technology; Thesis; Feb. 1999; Part 2 of 2; 81 pages.
Roters; "The Hysteresis Motor-Advances Which Permit Economical Fractional Horsepower Ratings;" Transactions of the American Institute of Electrical Engineers; vol. 66; No. 1; Jan. 1947; 12 pages.
Schammass, et al.; "New Results for Self-Sensing Active Magnetic Bearings Using Modulation Approach;" IEEE Transactions on Control Systems Technology; vol. 13; No. 4; Jul. 2005; pp. 509-516; 8 pages.
Schmid, et al.; "First Clinical Experience with the Incor Left Ventricular Assist Device"; Mechanical Circulatory Support; The Journal of Heart and Lung Transplantation; vol. 24; No. 9; Sep. 2005; pp. 1188-1194; 7 pages.
Silber, et al.; "Design Aspects of Bearingless Slice Motors;" IEEE/ASME Transactions on Mechatronics; vol. 10; No. 6; Dec. 2005; pp. 611-617; 7 pages.
Soucy, et al.; "Defining Pulsatility During Continuous-Flow Ventricular Assist Device Support;" The Journal of Heart and Lung Transplantation; vol. 32; No. 6; Jun. 2013; pp. 581-587; 7 pages.
Studer; "A Practical Magnetic Bearing;" IEEE Transactions on Magnetics; vol. 1; MAG-13; No. 5; Sep. 1977; pp. 1155-1157; 3 pages.
Takantani; "Progress of Rotary Blood Pumps: Presidential Address, International Society for Rotary Blood Pumps;" Artificial Organs; International Center for Artificial Organs and Transplantation; vol. 31; Issue 5; May 2007; pp. 329-344; 16 pages.
Teare; Jr., "Theory of Hysteresis-Motor Torque;" Transactions of the American Institute of Electrical Engineers; vol. 59; Issue 12; Dec. 1940; pp. 907-912; 6 pages.
Timms; "A Review of Clinical Ventricular Assist Devices;" Medical Engineering and Physics; vol. 33; No. 9; 2011; pp. 1041-1047; 7 pages.
Wampler, et al.; "A Sealless Centrifugal Blood Pump with Passive Magnetic and Hydrodynamic Bearings;" Artificial Organs; International Society for Artificial Organs; vol. 23; No. 8; 1999; pp. 780-784; 5 pages.
Wu, et al.; "A Self-Bearing Centrifugal Blood Pump Based on Induction Motor with Active and Passive Magnetic Bearings;" Fifth International Conference on Power Electronics and Drive Systems; PEDS; 2003; vol. 2; pp. 1642-1646; 5 pages.
Zhou; "Magnetically Suspended Reaction Sphere with One-Axis Hysteresis Drive;" Massachusetts Institute of Technology; Thesis; Jun. 2014; 190 pages.

(56) References Cited

OTHER PUBLICATIONS

Zhou, et al.; "Magnetically Suspended Reaction Sphere with One-Axis Hysteresis Drive;" Proceedings of ISMB 14; 2014; 7 pages.
PCT International Search Report and Written Opinion dated Oct. 14, 2016 for International Application No. PCT/US2016/045520; 13 Pages.
PCT International Preliminary Report dated Feb. 15, 2018 for International Application No. PCT/US2016/045520; 12 Pages.
PCT International Search Report and Written Opinion dated Sep. 7, 2017 for International Application No. PCT/US2017/038019; 6 Pages.
Office Action dated Jul. 18, 2019 for U.S. Appl. No. 16/220,566; 26 pages.
International Preliminary Report on Patentability dated Jul. 2, 2020 for International Application No. PCT/US2018/062990; 7 Pages.

\* cited by examiner

HOMOPOLAR BEARINGLESS SLICE MOTORS

CROSS-REFERENCE TO RELATED APPLICATIONS

This application claims the benefit of U.S. Provisional Application No. 62/718,478 filed on Aug. 14, 2018 and entitled "HOMOPOLAR BEARINGLESS SLICE MOTORS," and claims the benefit of U.S. Provisional Application No. 62/609,711 filed Dec. 22, 2017 and entitled "HOMOPOLAR BEARINGLESS SLICE MOTORS," which applications are hereby incorporated herein by reference in their entireties.

GOVERNMENT RIGHTS

This invention was made with Government support under Grant No. R41 HL134455 awarded by the National Institutes of Health. The Government has certain rights in the invention.

BACKGROUND

As is known in the art, a homopolar motor is an electric machine in which magnetic poles of a rotor as presented to a stator are provided have the same polarity along the rotor circumference, e.g., north-north-north-north. This characteristic makes homopolar motors different from conventional motors which typically have rotors with alternating magnetic poles along the rotor circumference, e.g., north-south-north-south.

As is also known, a bearingless motor is an electric machine having a rotor suspended at a center of a stator bore via magnetic levitation. The stator generates forces to magnetically levitate the rotor and also provides a torque to rotate the rotor. Such motors are suitable for applications that benefit from contact-free operations, such as blood pumps.

As is further known, a slice motor is a particular type of bearingless motor in which a rotor is provided having an aspect ratio (defined as rotor axial height divided by rotor diameter), designed to be sufficiently small to make some rotor degrees of freedom passively stable. Such a design reduces the number of rotor degrees of freedom requiring active stabilization via feedback controls, thereby saving components such as sensors, windings, and power amplifiers.

A homopolar bearingless slice motor is thus an electric machine that transforms input electric power to output mechanical power in a rotational form (i.e., a product of a torque and rotational speed) with a rotor having a desired aspect ratio. Such motors can be utilized in any applications that need rotary actuators and drives. Also, such motors utilize magnetic levitation. Thus, homopolar bearingless slice motors are particularly suitable for applications which benefit from contact-free rotary actuation.

Such motors can be utilized, for example, in bearingless centrifugal pumps that drive liquids sensitive to mechanical stress and heat, e.g., bloods and biological samples. Also, since the magnetic levitation can reduce, or in some cases eliminate, the usage of lubricants and generation of debris, such motors can be utilized for bearingless centrifugal pumps that drive liquids requiring a high level of purity control, e.g. such as in the semiconductor industry and chemical process industries.

Bearingless slice motors having temple-shaped stator armatures which drive permanent-magnet rotors have been developed as have bearingless motors that drive permanent-magnet rotors, and bearingless pumps using such motors. Also known are homopolar bearingless slice motors having a so-called "temple" design, where both of the stator and the rotor have magnets for homopolar flux-biasing.

Some slice bearingless motors have also been developed that allow decoupled rotation suspension control. Bearingless motors utilizing a permanent magnet-free structure for disposable centrifugal blood pumps are also known.

SUMMARY

Described herein are concepts and structures for homopolar bearingless slice motors.

In accordance with one aspect of the concepts, systems and techniques described herein, permanent magnets disposed on end portions of stator teeth closest to a surface of a rotor in a homopolar bearingless slice motor provide homopolar bias flux to a rotor.

With this arrangement, a homopolar bearingless slice motor having a flux path which is shorter that a flux path provided in conventional homopolar bearingless slice motors is provided. Providing a shorter flux path enables reduced usage of permanent magnets.

In embodiments, the permanent magnets may be provided from a pair of permanent magnet arrays which provide homopolar bias flux to the rotor. In an illustrative embodiment, two magnet arrays are placed at ends (or tips) of the stator teeth, so as to provide a bias flux via relatively short flux paths between the stator teeth and the rotor. By modulating a current through a winding based upon rotor radial and angular position measurements, the stator can levitate and rotate the rotor.

In embodiments, a first one of the magnet arrays is disposed on a first surface of ends of the stator teeth and a second array of magnets is disposed on a second opposing surface of ends of the stator teeth.

In embodiments, the magnet arrays are provided in a Halbach configuration.

In accordance with a further aspect of the concepts, systems and techniques described herein, a magnet-free rotor of a homopolar bearingless slice motors is provided having a surface from which project structures (also referred to as "salient features" or "members") having a geometry selected to route a bias flux provided by permanent magnets disposed thereabout toward paths desirable for force and torque generation.

With this particular arrangement, one or more permanent magnets or permanent magnets arrays may provide a homopolar bias flux to the rotor, and the salient features on the rotor surface route the bias flux toward paths desirable for force and torque generation. In an illustrative embodiment, two magnet arrays are placed at the tips of stator teeth, so as to provide the bias flux via relatively short flux paths. By modulating the current through the winding based on the rotor radial and angular position measurements, the stator can levitate and rotate the rotor. In embodiments, the permanent magnets are disposed on ends of a stator proximate a surface of the rotor.

Compared to prior art motors, the motor designs described herein differ in at least several respects. First, the homopolar bearingless slice motor described herein utilize flux-biasing permanent magnets. In one embodiment, the flux-biasing permanent magnets are arranged in a Halbach-type array configuration disposed around an outer surface of a rotor. Second, the homopolar bearingless slice motor described herein utilizes rotors having salient features that are coupled to a homopolar bias-flux.

In embodiments such salient features include, but are not limited to radial fins projecting from one or more surfaces (e.g. top and/or bottom surface of the rotor). In embodiments, such salient features include radial fins projecting from one or more surfaces (e.g. top and/or bottom surface of the rotor) and one or more structures (or members) provided on a side surface of the rotor. In embodiments, such salient features include radial fins projecting from one or more surfaces (e.g. top and/or bottom surface of the rotor) and a magnetic material disposed around a side surface of the rotor. Third, the homopolar bearingless slice motor described herein utilizes a stator having a winding scheme that physically separates windings for rotation functions from windings for bearing functions (i.e. the motor design described herein utilizes two separated windings: rotation windings and suspension windings). This approach reduces the number of power amplifiers required to drive the motor. Fourth homopolar bearingless slice motors provided in accordance with the concepts described herein utilize rotors which do not contain permanent magnets. Rather, homopolar bearingless slice motors provided in accordance with the concepts described herein utilize permanent magnets disposed in a Halbach array configuration and arranged on a stator and around a perimeter of a surface of the rotor outer. Furthermore, homopolar bias-flux enables decoupled rotation-levitation control.

The motor design described herein differs from prior art slice bearingless motors that allow decoupled rotation suspension control in several aspects. First, as noted above, the motor design described herein utilizes rotors which do not contain permanent magnets. Second, the motor design described herein utilizes coils forming the suspension winding which are all concentric. That is, each coil is only engaged with a single stator tooth. This approach differs from suspension winding designs in prior art slice bearingless motors in which where some coils forming a suspension winding span more than one stator tooth.

The motor design described herein differs from prior art bearingless motors utilizing a permanent magnet-free structure for disposable centrifugal blood pumps in the sense that the stator of the motor described herein has Halbach magnet arrays that provide homopolar bias-flux to the rotor. This approach enables at least two motor features: (1) decoupled rotation-suspension control; (2) less copper loss for suspension; and (3) Improved passive stiffness on the axial translation and out-of-plane tilts.

Accordingly, described herein are new flux-biasing designs. In embodiments, the flux-biasing is provided from permanent magnets disposed in a Halbach array configuration and disposed on a portion of stator teeth proximate an outer surface of a rotor. This approach results in a homopolar bearingless slice motors having characteristics which are favorable compared with like characteristics of existing homopolar bearingless slice motors. First, the techniques and structures described herein result in a single-sided air gap, i.e., the rotor is magnetically engaged with the stator only via a single (so-called "outer") air gaps. This allows the rotor inside to be used for other purposes, such as placing an embedded impeller or position sensors. Second, shorter flux path enables reduced usage of permanent magnets.

Elimination of permanent magnets from the rotor allows several benefits over the existing permanent-magnet bearingless motors. First, the rotor cost can be reduced by saving material and manufacturing costs. This can particularly advantageous to bearingless motors that require frequent rotor replacement, for example extra-corporeal blood pumps where the impeller-rotor unit should be disposed for each patient each time. Second, magnet-free rotors are more robustness to high-speed and high-temperature operating conditions.

Since no mechanical connections, such as bearings and shafts, are involved for the rotor suspension and torque generation, the motor described herein can be used for pumping delicate fluids such as biological samples. For example, the pump can be used as a blood pump to reduce the level of hemolysis and thrombosis. Also, the magnetic levitation eliminates unnecessary chemicals such as lubricants, which is beneficial for chemical processes that require a tight purity control. Potential commercial applications of this technology includes but is not limited to: miniature pumps for delivering delicate bio-medical samples that only allow a limited amount of exposure to mechanical stress and heat; and precision pumps for chemical processes and semi-conductor industries that requires a tight level of purity control.

Although the concepts described herein find application for use with the fluid pumps, the concepts are not limited to use with fluid pumps. Indeed, the broad concepts described herein can be applied to any areas or application that benefits from contact-free rotary actuation, including, but not limited to: high-speed spindles for machining; bearingless turbines; bearingless generators; electric vehicles; and turbochargers.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Figure 1:
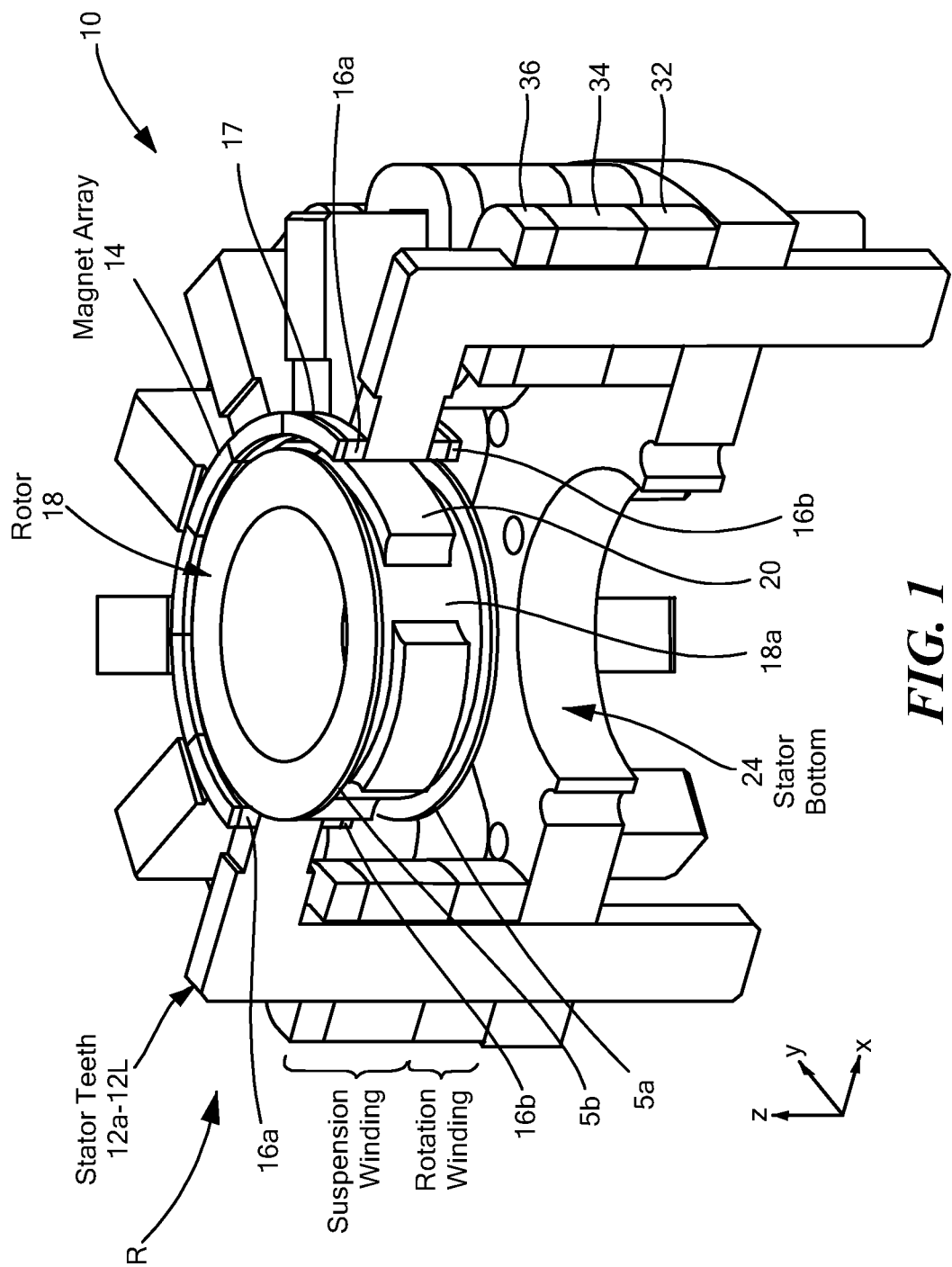
FIG. 1 illustrates a cross-sectional view of a homopolar bearingless slice motor according to embodiments described herein.

Referring now to FIG. 1, a homopolar bearingless slice motor 10 includes a stator 12 having a permanent magnet 14 disposed ends thereof proximate a rotor 18. In the illustrative embodiment of FIG. 1, stator 12 is provided from a plurality of L-shaped stator teeth 12a-12L and permanent magnet 14 is provided from a pair permanent magnets 16a, 16b disposed on opposing surfaces of stator teeth 12a-12L. In this illustrative embodiment, permanent magnets 16a, 16b are each provided from an array of magnets. Illustrative arrangements of arrays of permanent magnets are described below in conjunction with FIG. 9. The pair of array of permanent magnets 16a, 16b are disposed over opposing surfaces of ends (or tips) generally denoted 17 of stator teeth 12a-12L.

Homopolar bearingless slice motor 10 further includes a magnet-free rotor 18 having a unique surface geometry. Illustrative surface geometries of rotor 18 will be described in detail below. Suffice it here to say that rotor 18 is provided having an outer surface 18a which routes a bias flux provided by permanent magnets 14 toward paths desirable for force and torque generation. In this illustrative embodiment, rotor surface 18a is provided having salient features 20 which route a bias flux provided by permanent magnets 14 toward paths desirable for force and torque generation. In other embodiments, the magnet-free rotor 18 can have a substantially smooth surface and have internal channels or grooves that are configured to route the bias flux.

In embodiments, the permanent magnet arrays 16a, 16b provide homopolar bias flux to the rotor 18, and the salient features on the rotor surface route the bias flux toward paths desirable for force and torque generation.

In the illustrative embodiment of FIG. 1, two magnet arrays 16a, 16b are placed at the tips 17 of stator teeth. By locating the magnet arrays 16a, 16b proximate the tips of the stator teeth the bias flux is provided via relatively short flux paths. Providing a shorter flux path enables reduced usage of permanent magnets (i.e., a reduced "volume" of permanent magnets) thereby saving material costs. By modulating the current through the winding 30 (FIG. 2), based upon the rotor position measurements, the stator levitates and rotates the rotor.

In embodiments, salient rotor features include, but are not limited to, fins 5a-b projecting from one or more surfaces (e.g. top and/or bottom surfaces of the rotor). In an embodiment such salient features include radial fins projecting from one or more surfaces (e.g. top and/or bottom surface of the rotor) and one or more members 20 (or rotor "teeth") provided on a side surface of rotor 18. In an embodiment, such salient features include radial fins projecting from one or more surfaces (e.g. top and/or bottom surface of the rotor) and a magnetic material disposed around a side surface of the rotor. The rotor teeth 20 can be made of a low-carbon steel and be magnet-free. In an example embodiment, the rotor 18 is made of a single low-carbon steel piece with its peripheral surface machined to comprise radial fins 5a-b and rotor teeth 20. In another embodiment, a rotor (e.g., the rotor 18b of FIG. 4A) comprises a semi-hard magnetic material such as, but not limited to, D2 steel.

Figure 2:
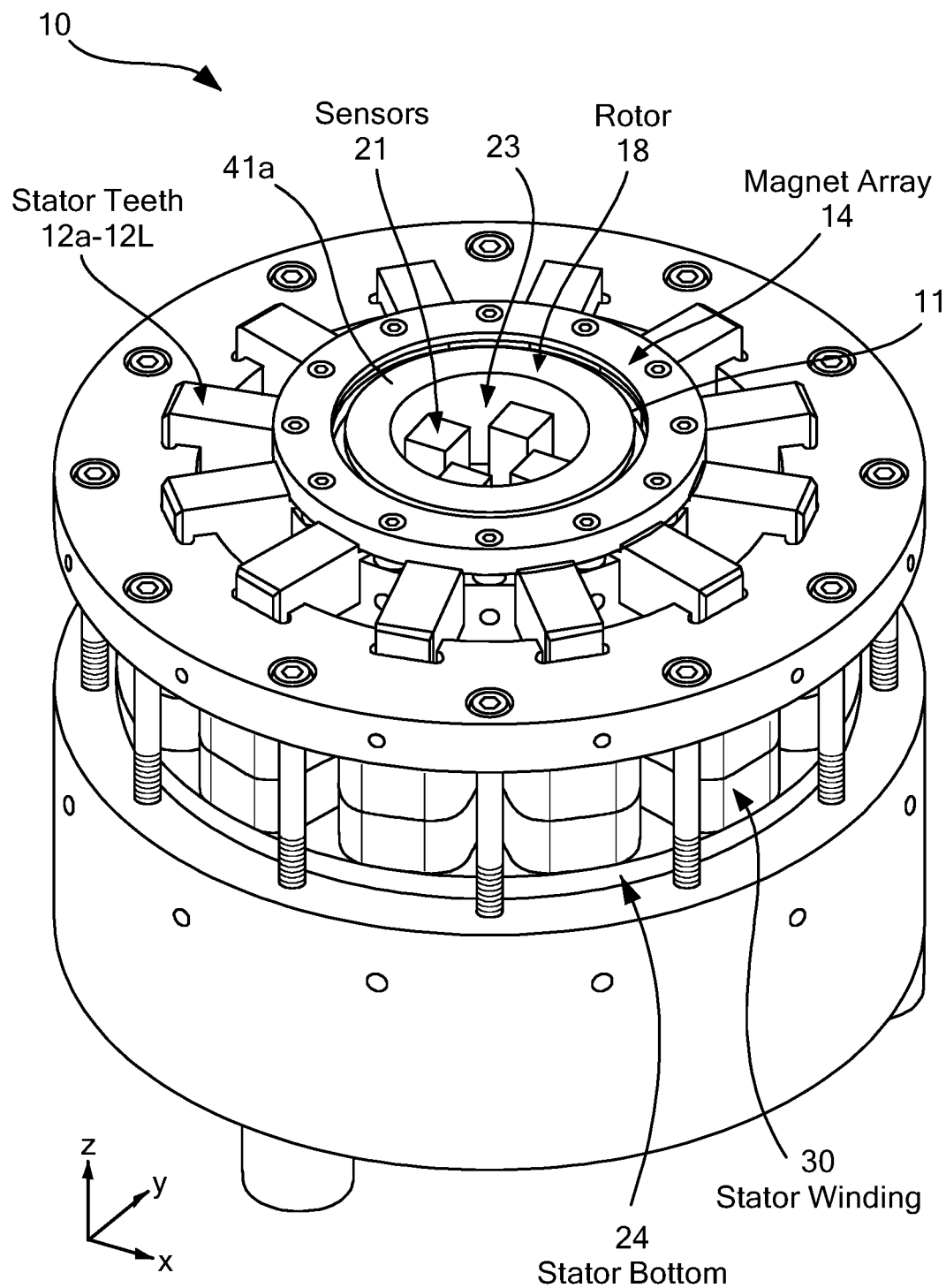
FIGS. 2-2A illustrate views of a homopolar bearingless slice motor comprising eddy-current sensors according to embodiments described herein.
Figure 2A:
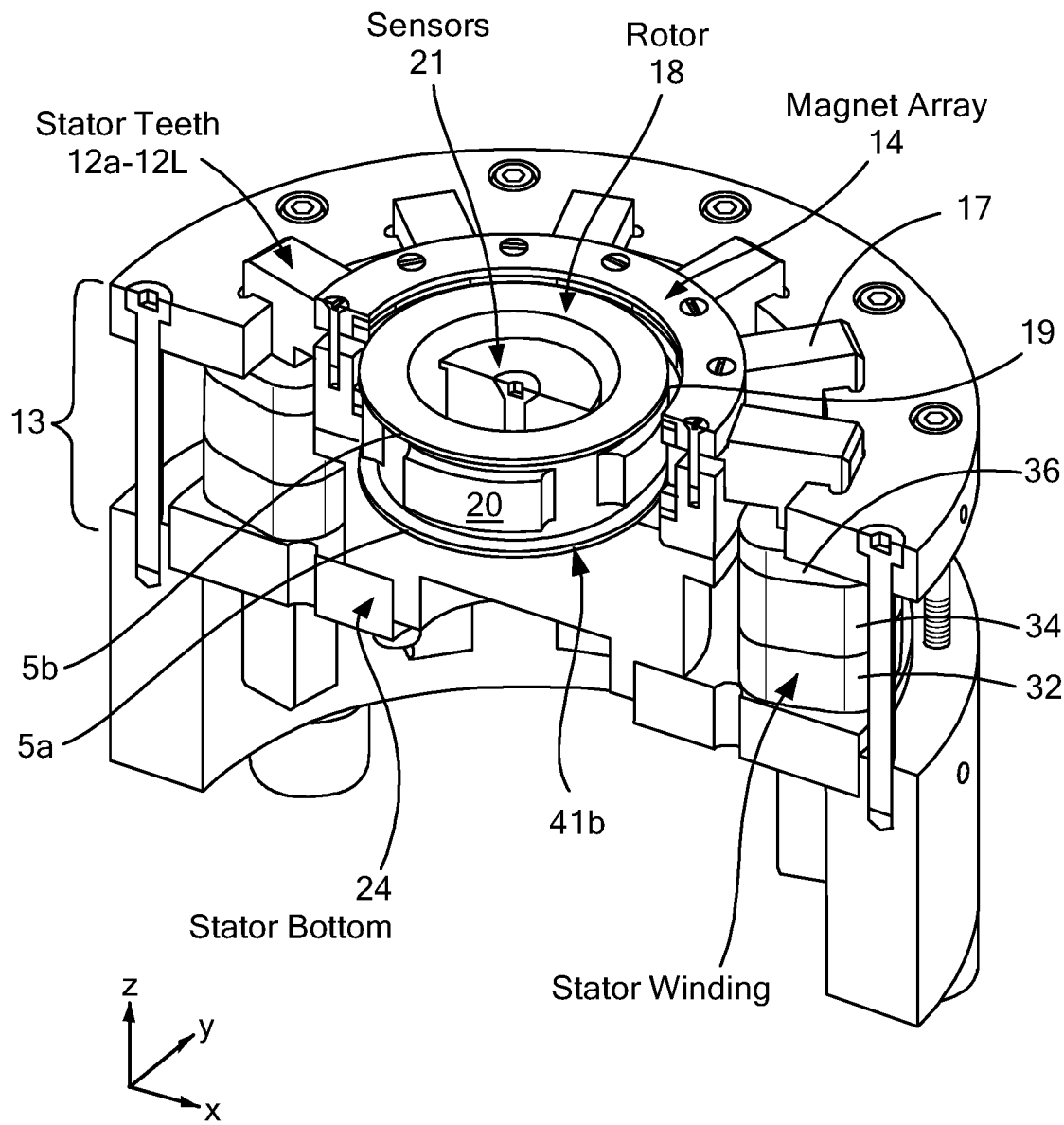

Referring now to FIGS. 2, 2A, in which like elements of FIG. 1 are provided having like reference designations, one illustrative embodiment of a motor 10 is shown to include a stator armature 13 comprised of a stator bottom plate 24 and a plurality of, here twelve, inverted L-shaped stator teeth 12a-12L, which are provided from an magnetically permeable material such as electrical steel. The stator teeth 12a-12L are circularly disposed on the stator bottom 24. When disposed in stator bottom 24, first ends of stator teeth 12a-12L form an opening or bore 11 that accommodates rotor 18. Second, opposite ends of the stator teeth are magnetically coupled via the stator bottom 24, which provides a common flux return path. The stator armature 13 and its possible design variations are described in detail hereinbelow.

A ring-shaped rotor 18 may then be inserted or otherwise disposed into the stator bore. In embodiments, ring-shaped rotor 18 may be formed or otherwise provided from low-carbon steel, e.g., AISI 1018. In other embodiments, the rotor 18 can comprise a material that exhibits high magnetic permeability. For example, the rotor 18 can comprise any ferromagnetic materials exhibiting relatively low hysteresis (called magnetically soft materials). The outer surface of the rotor has salient features 20 having mechanical and/or magnetic properties selected such that salient features route homopolar bias-flux from magnet arrays 16a, 16b (FIG. 1) toward the stator teeth 12 closer to the rotor saliency. The rotor design and its possible design variations are described in more detail further below. As used herein, the term "salient features" includes both the rotor teeth 20 and radial fins 5a-b. Specifically, the term "salient features" shall include any structures protruding from the rotor's peripheral surface. Here, the "salient features" that include both of the rotor teeth 20 and radial fins 5a-b are designed to route the bias flux as in FIG. 7. The flux 'flows' through the salient features because they are magnetically more permeable than air.

End (or tips) 17 of the stator teeth 12 directed toward (or facing) rotor 16 are coupled via two magnet arrays 16a, 16b. One magnet array, here array 16a, is aligned with the rotor top surface 41a, and the other magnet array, here array 16b, is aligned with the rotor bottom surface 41b. The design details of the magnet arrays and its possible design variations are described in more detail further below.

In the illustrative embodiment of FIGS. 2, 2A, each stator tooth 12a-12L has three coils 32, 34, 26 wound thereon (i.e. there are three (3) windings per each stator tooth) thus resulting in a total of thirty-six (36) coils wound on the stator teeth (in the case where the motor is provided having twelve stator teeth). Currents driven through coils 32-36, in coordination with the rotor position and orientation, generate a desired pattern of magnetomotive force (MMF) across an air gap 19 between the rotor and stator for levitating and rotating the rotor. The design details of an illustrative winding scheme and its possible design variations are described in more detail further below.

As most easily viewed in FIG. 2A, four eddy-current sensors 21 are mounted or otherwise disposed at the stator center 23 to measure rotor radial positions. Each of the sensors measures the distance to the inner rotor surface. The rotor radial positions x and y can be measured by taking a difference between the outputs of a pair of diametrically opposed sensors. In embodiments, a rotor rotational angle φ, which is needed for rotor rotation control, may be measured or otherwise estimated with Hall effect sensors placed between the stator teeth. The details and possible variations of the sensor designs are described in more detail further below.

The measured rotor radial positions and rotational angle are used for feedback control of the bearingless motor. The bearingless motor is a closed-loop system comprising sensors, a controller, power amplifiers, and motor hardware. The details and possible variations of control systems are described in more detail further below.

Figure 2B:
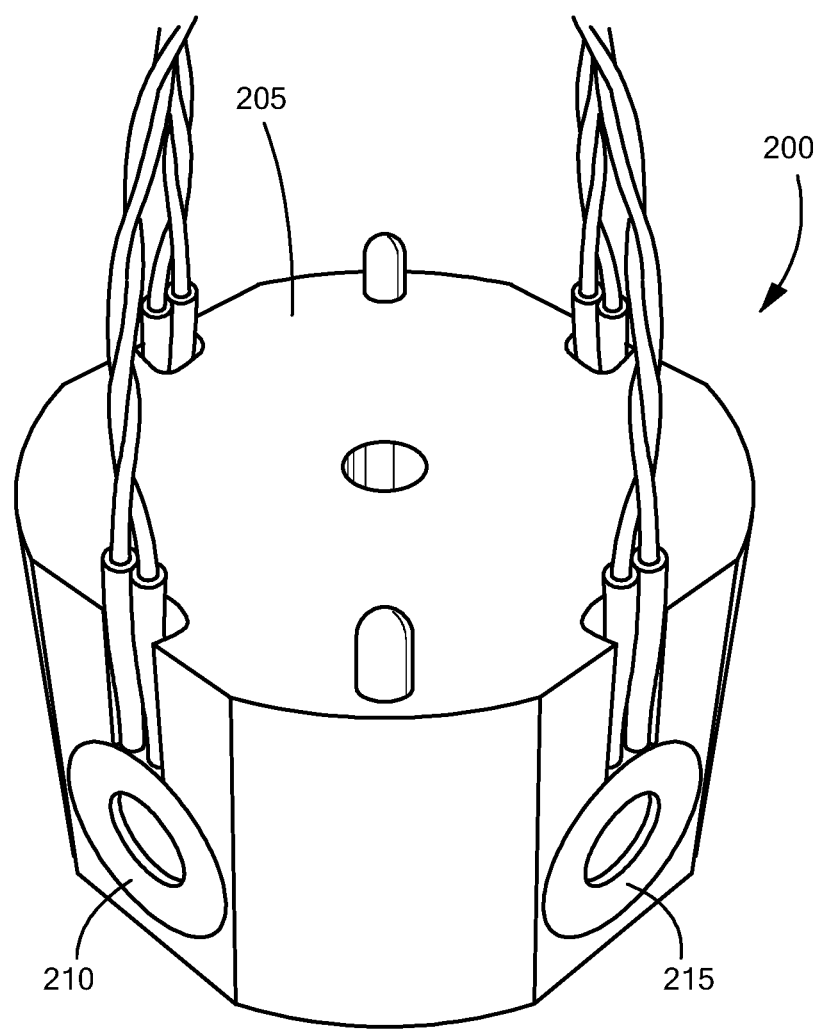
FIG. 2B illustrates coils for eddy-current sensors according to embodiments described herein.

Referring now to FIG. 2B, a sensor module 200 that can be used in place of the four stand-alone eddy-current sensors of FIG. 2A comprises a sensor housing 205 and one or more sensing coils 215. The sensor module 200 is then can be coupled to an external driver to measure the rotor radial positions. The one or more sensing coils are disposed within pockets 210 that are formed within sides of the sensor housing 205. The sensor module 200 can be placed within the stator center to measure rotor radial positions thus performing the same rotor radial position measurement function as the four stand-alone eddy-current sensors of FIG. 2A.

As in other typical motors, the stator armature of the illustrative motor can be made of electrical steel, for example with 0.33 mm lamination thickness. Thinner lamination is better if the motor excitation frequency is relatively high, but thicker lamination or even a solid steel can be used if the excitation frequency is relatively low, and therefore iron loss is not a significant concern. When an AC magnetic flux passes through a permeable and conductive material (such as iron), the flux is not uniformly distributed across the cross section—it is rather localized in the vicinity of the outer surface called "skin depth". This is because the AC magnetic flux induces eddy currents inside the material and this buck out the magnetic flux. This means that the material is underutilized. Also, the induced eddy currents dissipate heat, and increase "iron (power) loss". Accordingly, embodiments of the invention laminate the material, so that the thickness of the lamination is similar to the skin depth, to fully utilize the magnetic material to conduct magnetic flux, and also minimize the power loss.

In the illustrative embodiment shown in FIGS. 2 and 2A, the stator is provided having inverted L-shaped teeth which route magnetic flux via three-dimensional paths. Often referred to as a temple motor in the bearingless motor literature, this three-dimensional armature structure allows for more room to accommodate motor windings that current motor designs.

Figure 3:
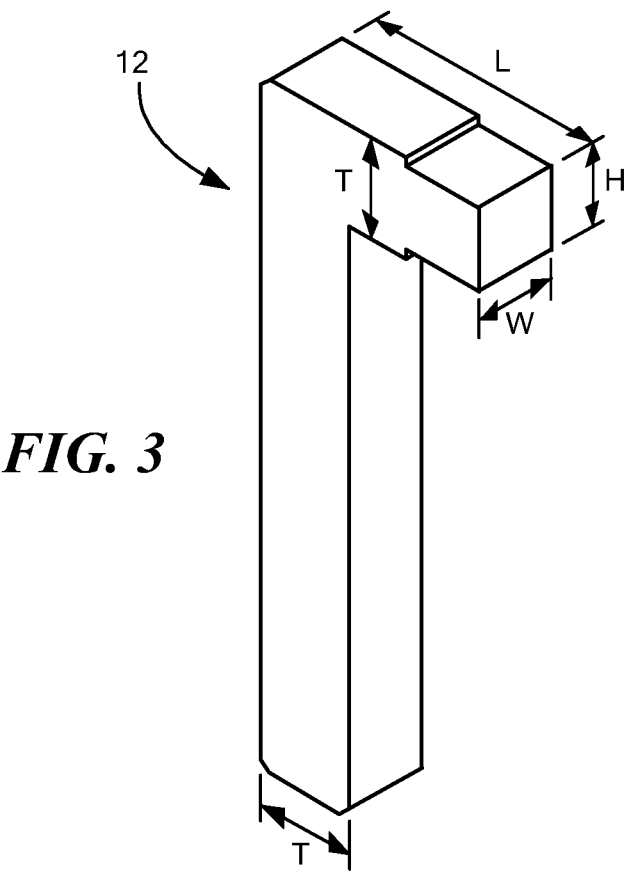
FIG. 3 illustrates a stator tooth according embodiments described herein.
Figure 3A:
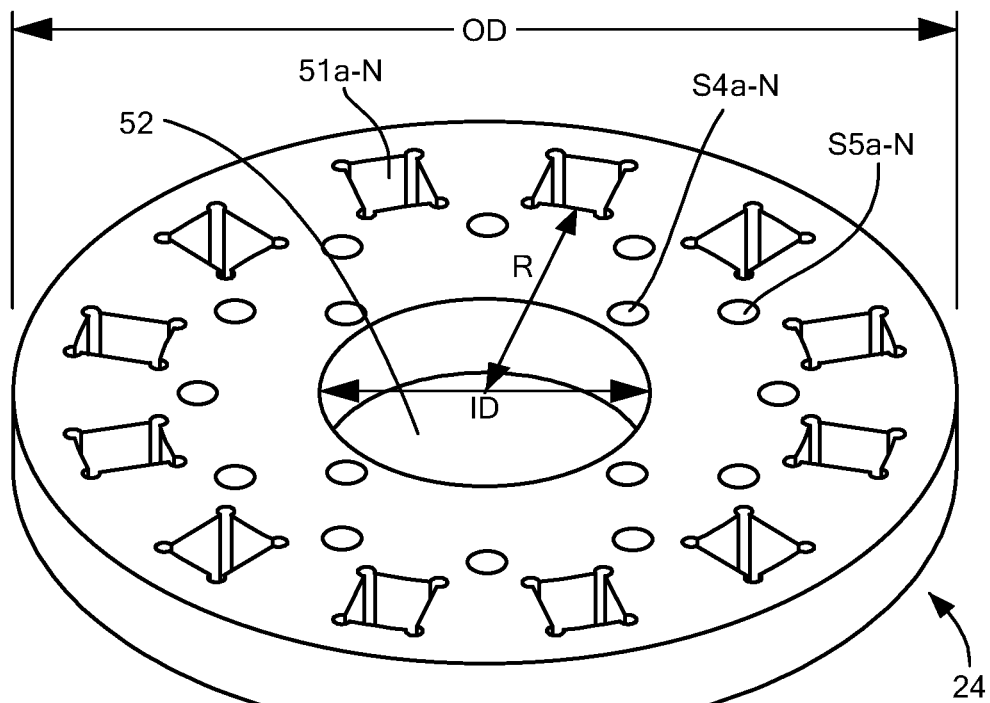
FIG. 3A illustrates a stator bottom according embodiments described herein.

Referring now to FIGS. 3, 3A to make the temple-shaped armature with electrical steel, one needs to make the stator bottom plate 24 and the stator teeth 12a-12N separately and assemble them afterwards. The stator tooth 12 is shown in FIG. 3 while the stator bottom plate 24 is shown in FIG. 3A. One way to fabricate these parts is to stack and bond lamination steels, and then machine the bonded lamination stack via wire-EDM into a desired planar structure. The lamination directions for the stator tooth 12 and the stator bottom 24 are selected to ensure that the AC flux paths are not orthogonal to the lamination planes.

As shown also in FIG. 3, the stator tooth 12 thickness ('T') steps down near the stator bore (e.g., the bore 11 of FIG. 2). This staircase structure focuses the flux generated by the stator winding, thereby increasing the air-gap flux density. Also, the vertical flanges of the staircases can be used as reference surfaces against which the magnet-array assemblies can be aligned. This helps make the stator teeth 12a-12N and magnet-array 14 assembly concentric. Other techniques may, of course, also be used to align the magnet arrays 14.

The stator bottom 24 has circularly disposed rectangular (or generally rectangular) holes 51a-N into which ends of the stator teeth can be inserted. In general openings 51 are provided having a shape selected to accept the cross-sectional shape of an end of stator teeth 12 to be disposed in the openings. In embodiments, the dimensions of openings 51 are selected so as to provide a press fit with the ends of teeth 12 so as to secure teeth 12 to stator bottom 24. Other techniques for securing stator teeth 12 to stator bottom plate 24 may also be used including but not limited to fastening techniques, welding techniques, epoxy techniques, and 3D printing techniques.

The stator bottom 24 has one central hole 52, and two sets of circularly disposed holes 54a-N, 55a-N. The central hole 52 can be used to insert a structure that mounts magnet arrays and position sensors. The set of twelve holes 55a-N arranged closer to the stator teeth can be used to pass the winding leads and make the connections under the stator bottom 24. The set of four holes 54a-N arranged closer to the center can be used to fasten the structure mounting sensors and magnet arrays.

The stator armature (e.g., the stator armature 13 of FIG. 2A) can be also made as a single piece. For example, one can make it with sintered soft magnetic composite (SMC) materials. Alternatively, one can machine a chunk of low-carbon steel to make a single-piece armature. The SMC materials are better to reduce the eddy-current loss, but if such a loss is not a concern, the stator armature can be made of solid steel.

The temple-shaped armature is topologically equivalent to typical planar stator structure. That is, by flattening the L-shaped teeth, one can provide a planar stator structure that can implement the same magnetic design. Also, the stator can have more than twelve stator teeth.

Figure 4:
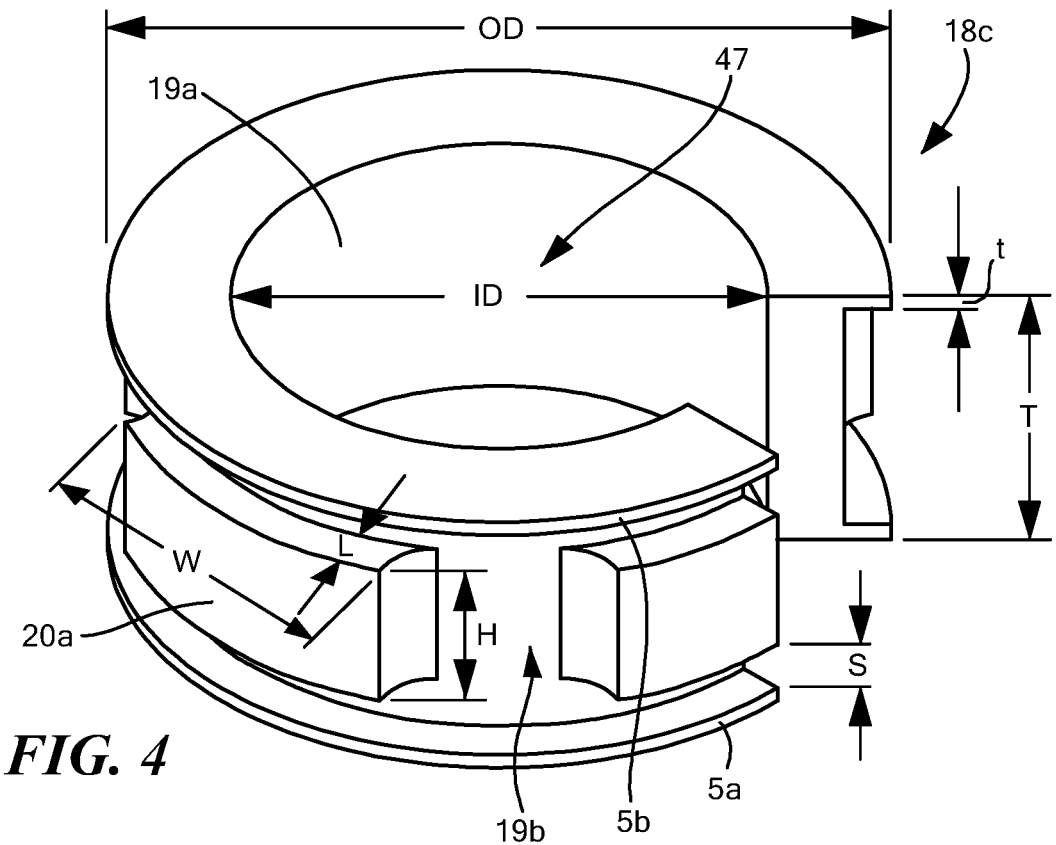
FIG. 4 illustrates a rotor according embodiments described herein.
Figure 4A:
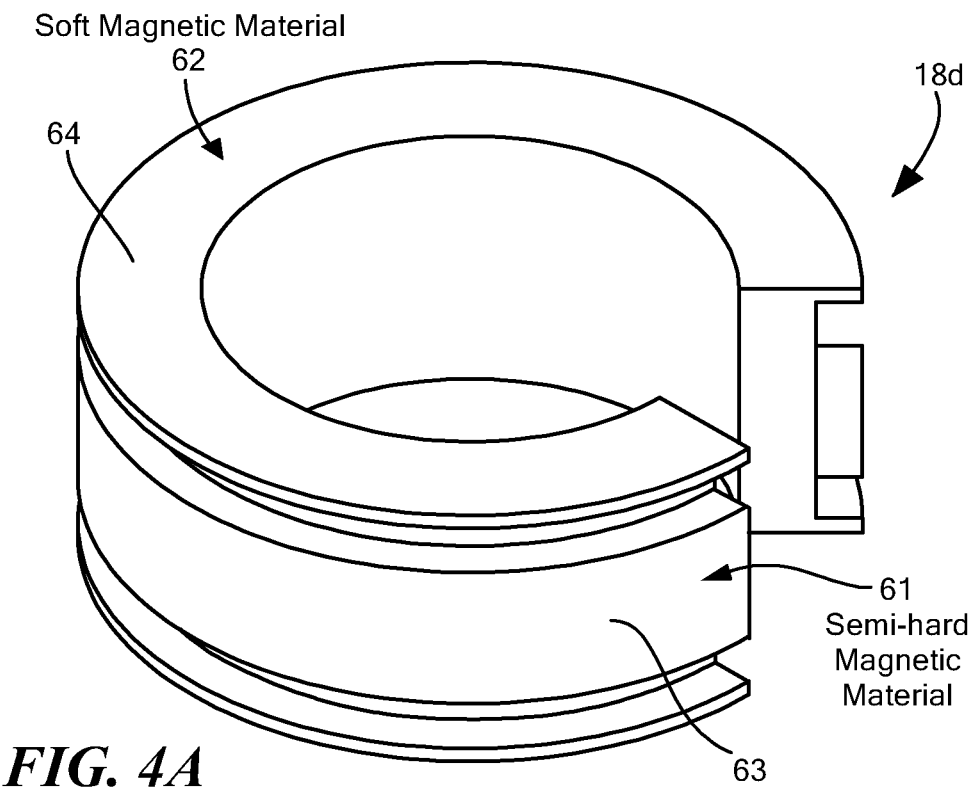
FIG. 4A illustrates another rotor according embodiments described herein.

Referring now to FIGS. 4, 4A, two illustrative rotor embodiments 18c-d are shown. Significantly, the rotors do not include permanent magnets.

The rotor 18c shown in FIG. 4, referred to herein as a reluctance rotor, can be made of any magnetically-permeable materials. For example, low-carbon solid steels, such as AISI 1006, 1008, 1010, 1018, and etc., are good candidates to make the reluctance rotor 18c. One can machine a chunk of solid steel to make a single-piece rotor. If the eddy-current loss in the rotor 18c is a concern, the rotor 18c can be made of electrical steels, but this requires making multiple planar structures and assembling them afterwards.

TABLE 1

Reluctance rotor geometric parameters.

| | Parameter | Value |
| --- | --- | --- |
| T | Thickness | 19 mm |
| OD | Out diameter | 50 mm |

TABLE 1-continued

Reluctance rotor geometric parameters.

| | Parameter | Value |
|---|---|---|
| ID | Inner diameter | 34 mm |
| t | Fin thickness | 1 mm |
| S | Fin-teeth separation | 3.5 mm |
| W | Tooth width | 23 mm |
| H | Tooth height | 10 mm |
| L | Tooth length | 3 mm |

The reluctance rotor 18c is ring-shaped, and its thickness/outside-diameter ratio (T/OD) is relatively small. Table 1 lists nominal values of geometric parameters of an illustrative reluctance rotor. The inner cylindrical surface 19a of the rotor can be used for eddy-current sensors to measure the rotor radial positions, as shown in FIG. 2A. If sensing schemes that measure the outer rotor surface 19b are used, the central hole 47 of the rotor can be decreased or even completely eliminated by filling it with solid materials. This can help magnetic levitation, because for the same negative radial stiffness $k_r$, the increases rotor mass m lowers the open-loop unstable frequency $\omega_u = \sqrt{k_r/m}$ of the suspension system.

The outer surface 19b of the reluctance rotor 18c has unique salient features including 20a and 5a-b. The rotor has two circular fins 5a-b protruding radially outwards, one from the top 5b and the other from the bottom 5a. These fins 5a-b are where the homopolar bias flux from the magnet arrays enter (or leave if the magnetization of the magnet arrays is reversed) the rotor 18c. Having small fin thickness t, e.g., t<1 mm, can help magnetic levitation. This is because the bias flux can saturate the thin fins 5a-b more easily, and the magnetic saturation makes the variation of the magnetic flux density in the fins 5a-b relatively insensitive to the rotor position variation, thereby leading to smaller radial negative stiffness $k_r$.

The axial separation between the fins 5a-b and rotor teeth S should be sufficiently large to achieve good performance in radial force generation. Too small separation S can result in insufficient force/current sensitivity of the levitation system. Also, small separation S can make the radial force not monotonically increasing with respect to the amplitude of the suspension winding MMF, which makes it difficult to lift off an off-centered rotor.

In this illustrative embodiment, between the two fins 5a-b, the reluctance rotor has four teeth equally spaced along the circumference. The rotor tooth (e.g., the tooth 20a of FIG. 4) is designed such that its width W span a circumferential length covering about two stator teeth, e.g., W≈23 mm. This rotor teeth design minimizes the cogging torque. As will be described below in conjunction with FIG. 5, one factor to consider in selecting the number of stator teeth to use in a particular application is cogging torque.

Figure 5:
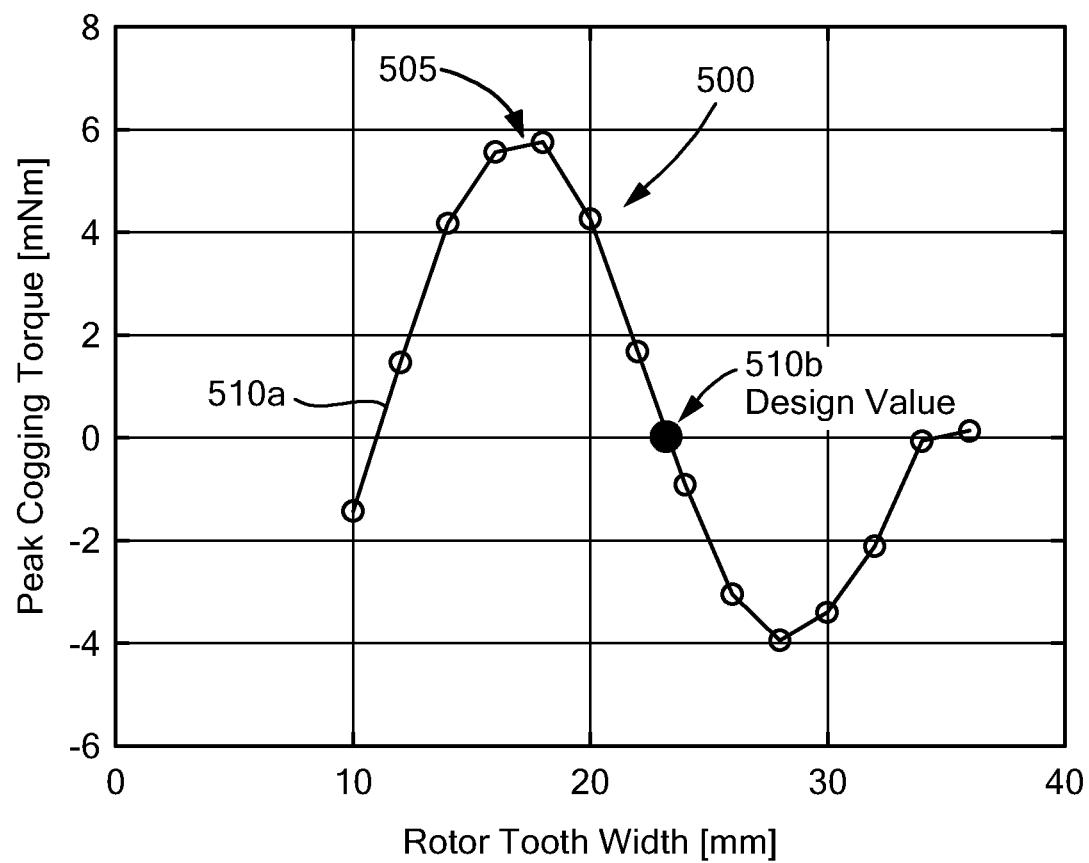
FIG. 5 illustrates a graph that plots Rotor Tooth Width (W) vs. Peak Cogging Torque according embodiments described herein.

Referring now to FIG. 5, a plot of Rotor Tooth Width (W) vs. Peak Cogging Torque include a curve 500 which shows cogging torque with respect to rotor tooth width W. The data are obtained from a finite-element analysis (FEA) simulations performed using the magnetostatic solver of ANSYS Maxwell software. Here, the curve 500 has two zero-crossing 510a-b points at W≈11 mm and W≈23 mm. In one particular illustrative bearingless motor design, a peak W=23 mm is selected for the rotor tooth design.

The number of the rotor teeth can, of course, be fewer or more than four, but more rotor teeth proportionally increases the required electrical frequencies of the rotation winding MMF. That is, given the rotor mechanical speed $\Omega_r$, the required electrical frequency for the rotation winding MMF is $\omega_r = p\Omega_r$, where p is the number of rotor teeth and equivalently the number of pole pairs of the rotation winding MMF.

Referring again to FIG. 4A, the rotor 18d (sometimes referred to as a hysteresis rotor), can be made as a single piece by machining a solid steel, or made of two different steels. A single-piece rotor can be made of semi-hard magnetic materials, such as D2 steel. Or, the inner ring 64 can be made of soft magnetic materials 62, such as low-carbon steels, and the outer ring 63 can be made of semi or medium-hard magnetic materials 61, such as AlNiCo or CROVACR®. The inner ring 64 can be made as two halves, the top and bottom ones, and then press-fitted into the outer ring 63.

The stator has permanent magnets (e.g., magnet array 14 of FIG. 1) that provide the rotor with homopolar bias flux.

Figure 6:
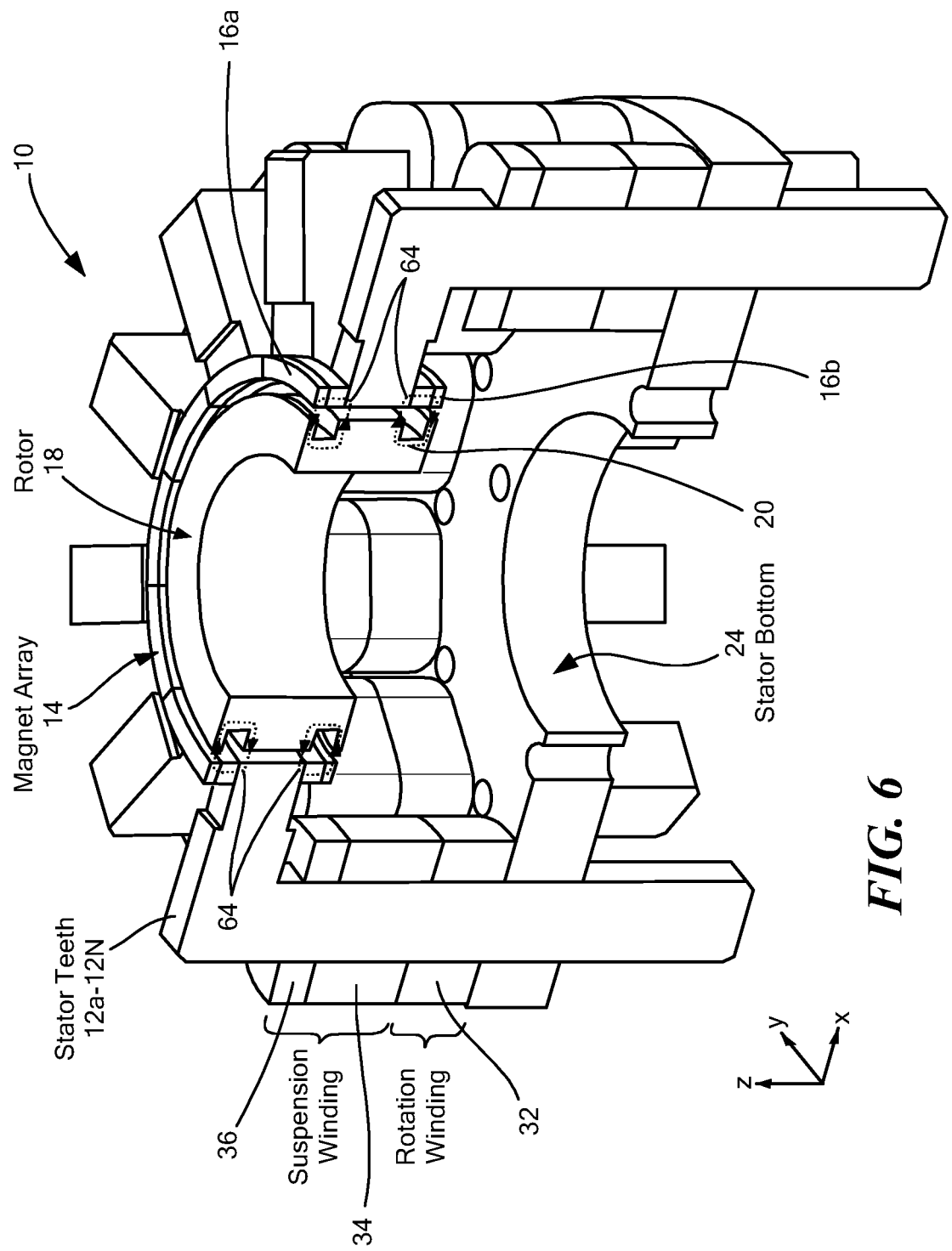
FIG. 6 illustrates a flux-biasing design of a bearingless motor according embodiments described herein.

Referring now to FIG. 6, shown is a flux-biasing design of the bearingless motor 10 provided in accordance with the concepts described herein. The dashed lines designated by reference number 64 represent homopolar bias flux generated from the permanent magnets 14. The magnet arrays 14 can be made of any hard magnetic materials, such as NbFeB, SmCo, AlNiCo, Ferrite, etc.

In the structure of FIG. 6, the magnets 14 are located relatively close to the rotor compared with the same spacing achieved in prior art homopolar bearingless slice motors. Two annular magnet arrays 16a, 16b are placed at the tips 17 of the stator teeth 12. One magnet array 16a is substantially aligned with a first or top surface 18a of the rotor 18, and the other array 16b is substantially aligned with a second or bottom surface 18b of the rotor 18. In this illustrative embodiment, each magnet array 16a-b comprises arc-segment magnets. Other techniques for providing one or both of magnet arrays 16a, 16b may also be used.

Figure 7:
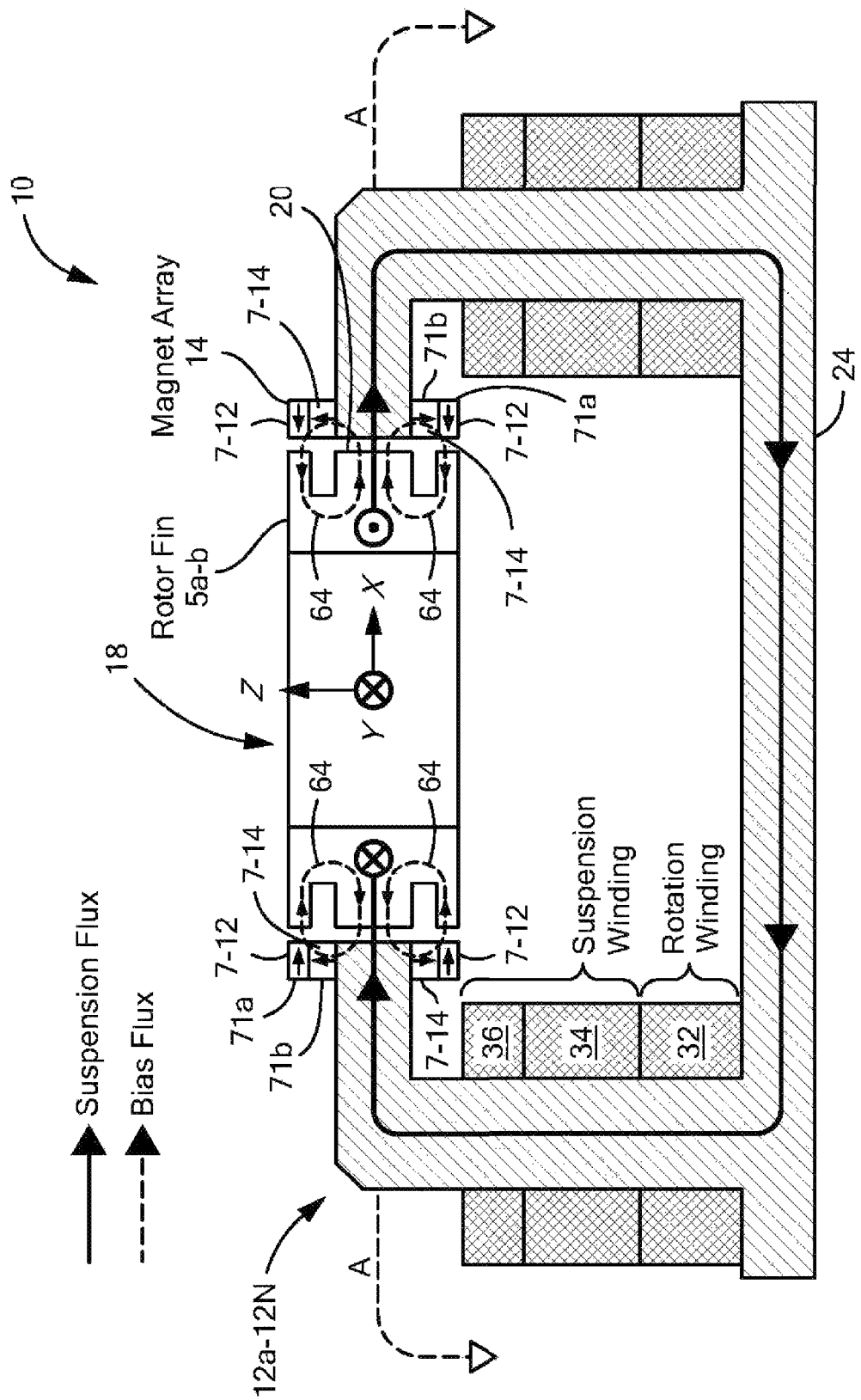
FIG. 7 illustrates a schematic representation of the flux-biasing design of the motor design of FIG. 6 according embodiments described herein.

As shown in FIGS. 6 and 7, the homopolar flux generated by the permanent magnet arrays 16a-b passes the rotor via a local path provided from the magnet, top and bottom air gaps, rotor, and middle air gap.

Referring now to FIG. 7, a schematic representation illustrates the flux-biasing design of the motor design 10 described herein. Each of the permanent-magnet arrays 14 includes two sets of magnets 71a-b magnetized in two different directions, which forms a Halbach array configuration. The magnets 71a closer to the rotor fins are radially magnetized, as marked with horizontal arrows 7-12 in FIG. 7. The others 71b closer to the stator teeth are axially magnetized, as marked with vertical arrows 7-14 in FIG. 7. This magnetization pattern forces the homopolar bias-flux toward the rotor side, which makes more permanent-magnetic flux is engaged with the rotor. The dashed lines 64 in FIG. 7 represent the homopolar bias flux from the permanent magnets 14. The bias flux enter the rotor via the radial fins, and exit the rotor via the rotor teeth. One magnet array is a mirrored image of the other magnet array. That is, the magnetization patterns of the two magnet arrays are symmetric with respect to Section A-A.

In the bearingless motor described herein, the homopolar bias-flux makes some rotor degrees of freedom passively stable due to the reluctance force. Specifically, referring to FIG. 7, the axial translation along z-axis and tilting about x- and y-axes are passively stable. However, two radial translations along x- and y-axes are open-loop unstable. Therefore, these two degrees of freedom needs to be stabilized via feedback control, which are explained herein in more detail. The axial rotation about z-axis is stable, or marginally stable in the worst case, which is also feedback-controlled for current commutation, torque generation, and speed regulation. Details in torque generation are explained herein.

As noted above, in an illustrative embodiment, the winding of the bearingless motor have 36 coils. In other embodiments, fewer or more coils may, of course, be used. The coil leads are interconnected to form two sets of three-phase windings: suspension winding and rotation winding.

Figure 8:
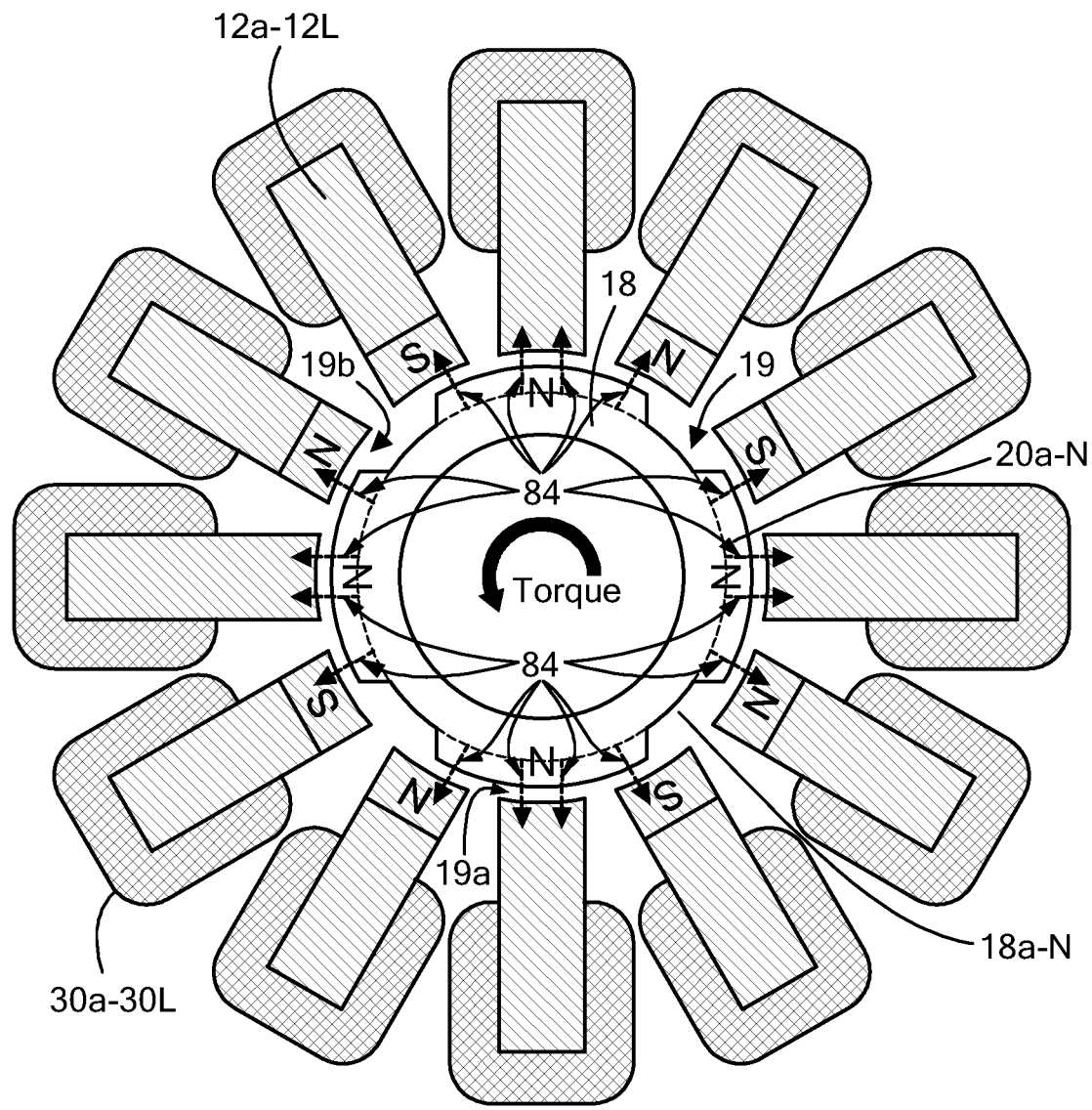
FIG. 8 is a cross-sectional view of motor 10 taken across lines A-A in FIG. 7.

FIG. 8 schematically shows Section A-A of FIG. 7. Here, the flux density vectors across the air gap 19 are shown as dashed lines identified with reference numeral 84. The rotor teeth 20a-N steer the homopolar flux towards the stator teeth 12a-L closer to the rotor teeth 20a-N. That is, the air gap 19a between the stator teeth 12a-L and rotor teeth 20a-N are smaller than air gap 19b between the stator teeth and rotor surface 18a-N. Therefore, the homopolar bias-flux is focused and returning via the rotor teeth 20a-N. As a result, the homopolar air gap flux density exhibits a periodic undulation, where the maximum magnitudes occur on the rotor teeth 20a-N and the minimum magnitudes occur on the rotor inter-teeth 18a-N. This periodic flux density enables torque generation as interacting with a traveling MMF wave generated by the stator coils 30a-L, specifically by the rotation coils 32a-L in FIGS. 10B and 13. The rotor tooth height H in FIG. 4 is designed to match with the stator tooth height H in FIG. 3.

Figure 9:
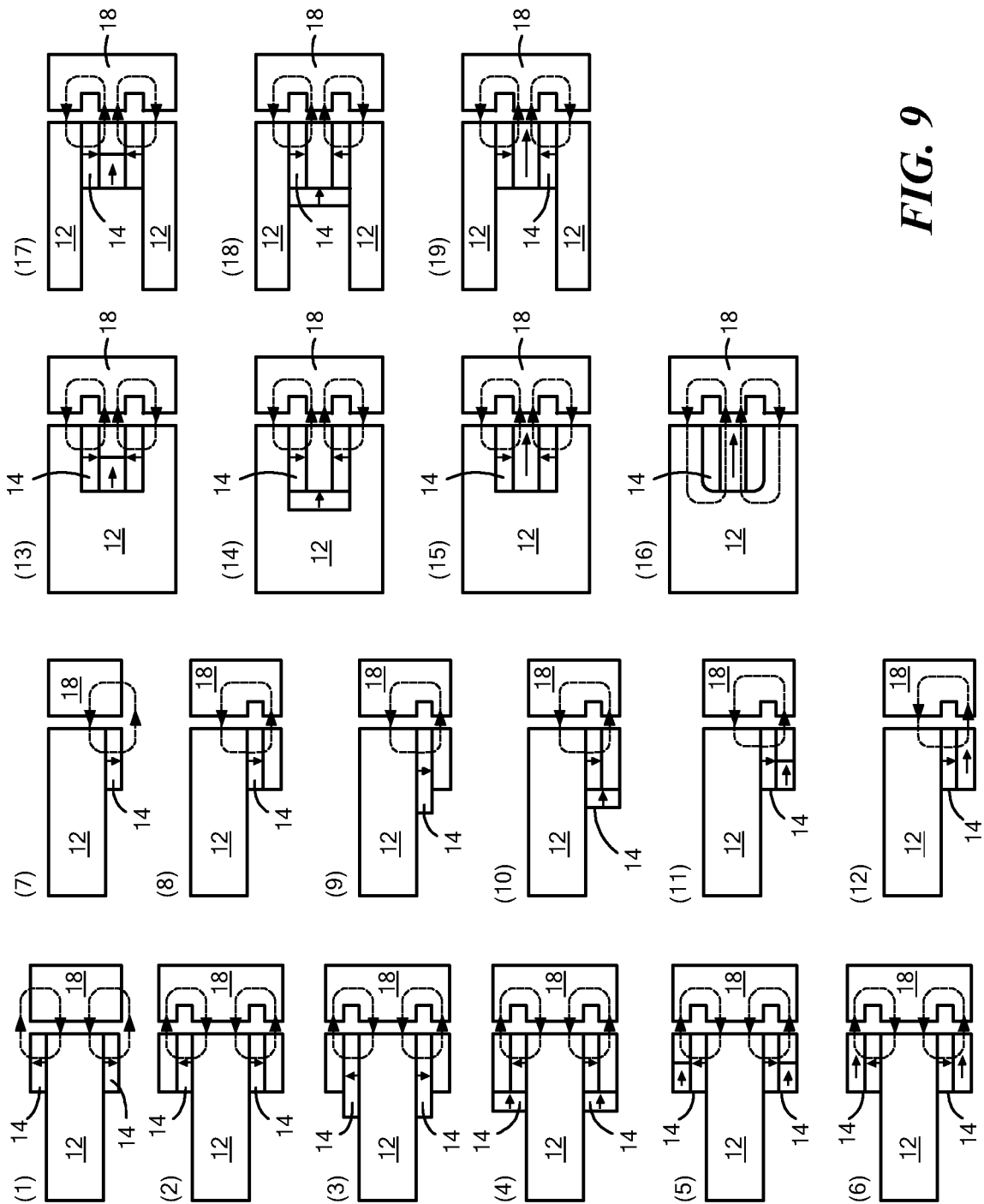
FIG. 9 illustrates a variety of alternative magnet array designs, each of which is suitable for use in motor provided in accordance with the contents described herein.

Referring now to FIG. 9, shown are a variety of alternative designs for the magnet array 14. For all sub-figures (1) through (19), the left part is a section of the stator 12, and the right part is a section of the rotor 18. Permanent magnet arrays 14 are placed on the stator.

Figure 10A:
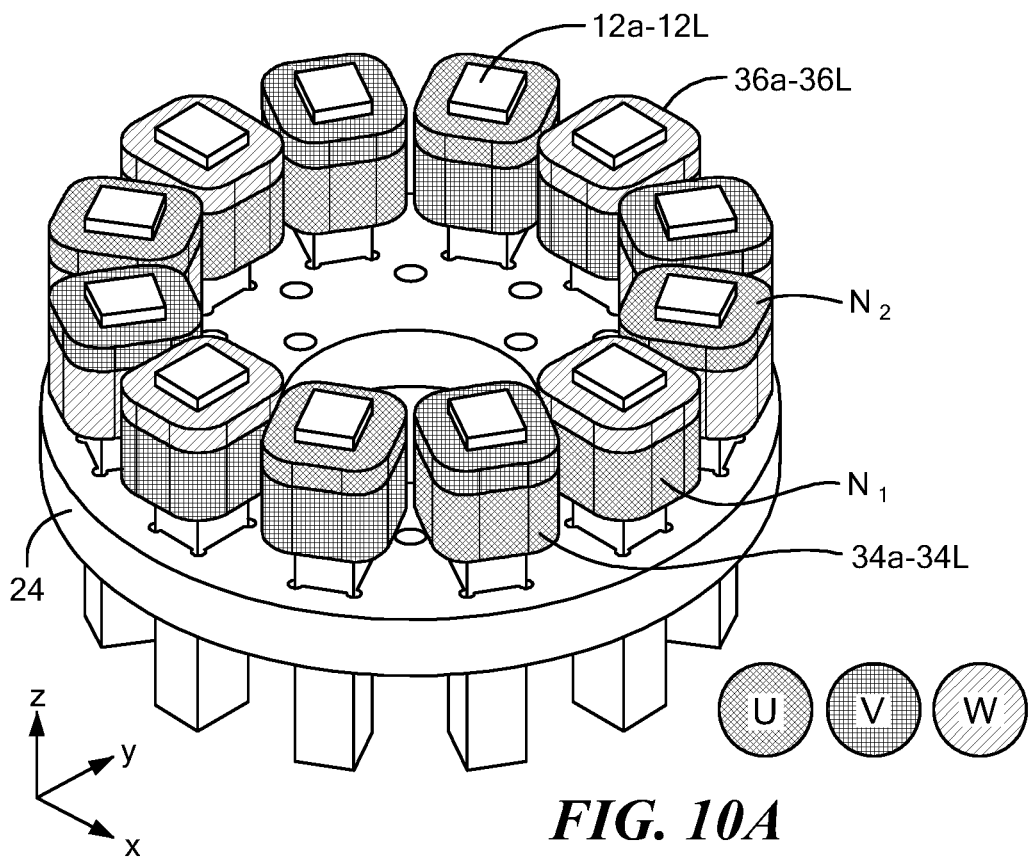
FIGS. 10A-B illustrate illustrative winding schemes for a motor provided in accordance with the concepts described herein.
Figure 10B:
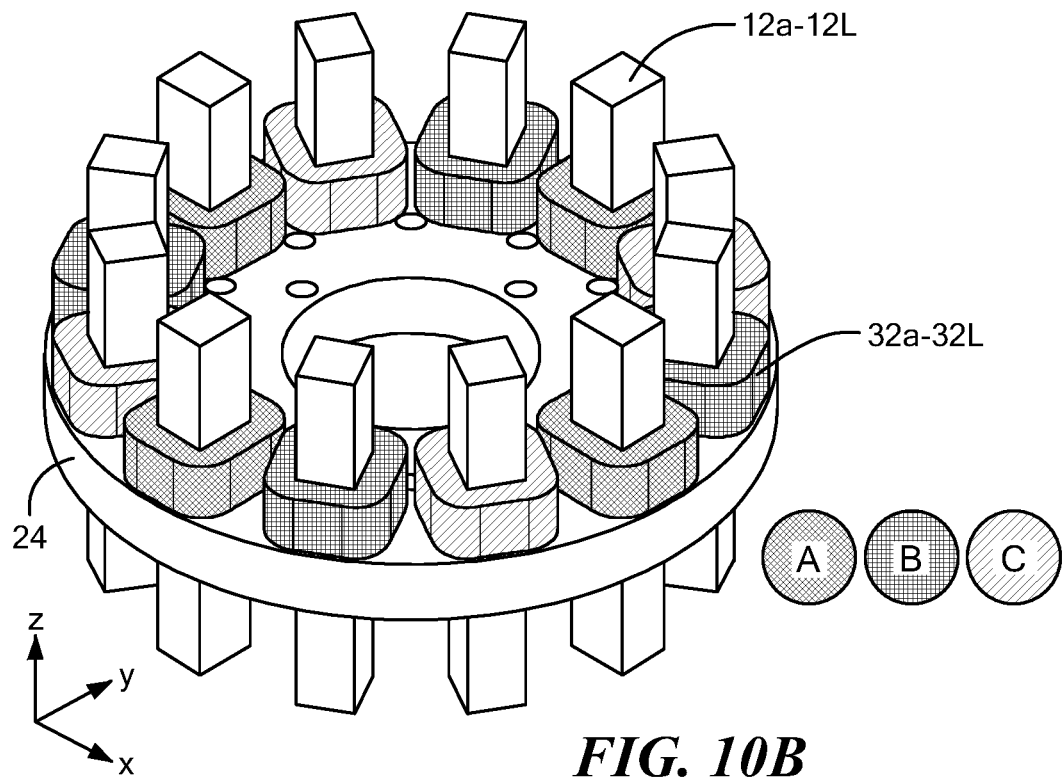

FIGS. 10A and 10B illustrate winding schemes, where the coils are labeled (and shaded) to show the phase configuration. FIG. 10A shows the coils 34a-L, 36a-L forming the suspension winding. FIG. 10B shows the coils 32a-L forming the rotation winding. This winding scheme, where the windings for torque generation and suspension force generation are physically separated, is called a separated winding in the bearingless motor literature. This winding scheme can reduce the required number of power electronics. Two three-phase power amplifiers can run the motor.

Alternatively, one can implement combined winding scheme, where each stator tooth has a single coil that contributes to both torque and force generations. The combined winding scheme is explained in U.S. patent application Ser. No. 15/227,256 filed Aug. 3, 2016 and assigned to the assignee of the present application and hereby incorporated herein by reference in its entirety.

The suspension winding generates two-pole MMF distribution around the rotor, which induces imbalanced flux density distribution of the homopolar bias-flux and generates radial forces. The principle of radial force generation is similar to that of typical homopolar-biased magnetic bearings.

The suspension winding comprises wye-connected three phases (U,V,W), where each phase comprises eight coils connected in series. The three phases overlap each other on the stator teeth, i.e., each stator tooth 12a-L are engaged with two coils 34a-L, 36a-L from two different phases as shown in FIG. 10A. This winding scheme allows the suspension winding to generate more sinusoidally distributed two-pole MMF around the rotor.

Figure 11C:
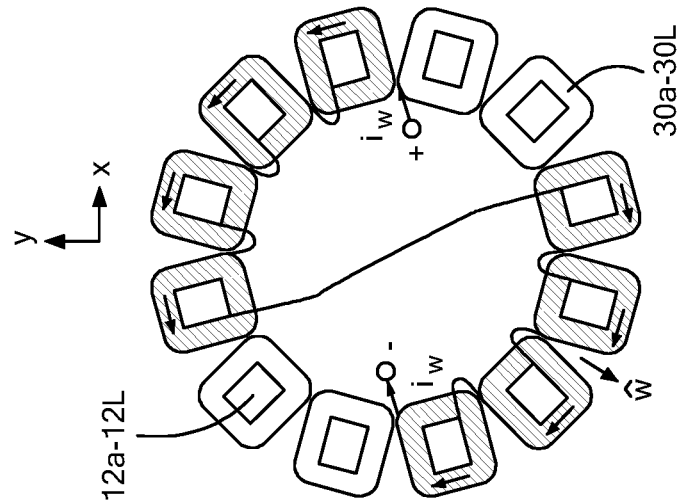
FIGS. 11A-C illustrate suspension winding configurations for phases U, V, and W, respectively, according embodiments described herein.
Figure 11B:
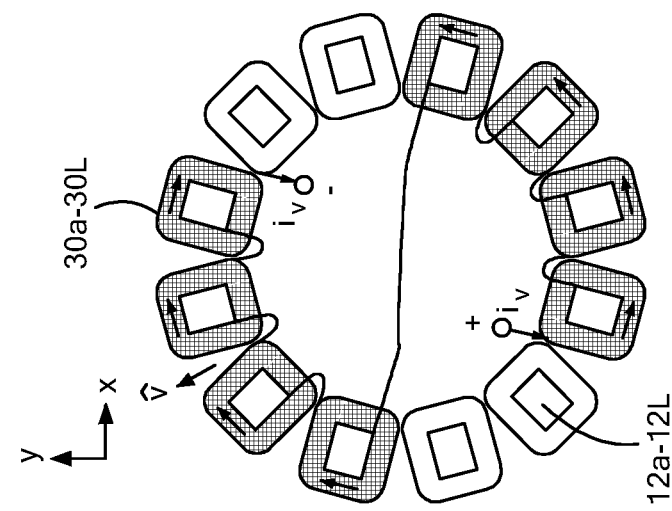
Figure 11A:
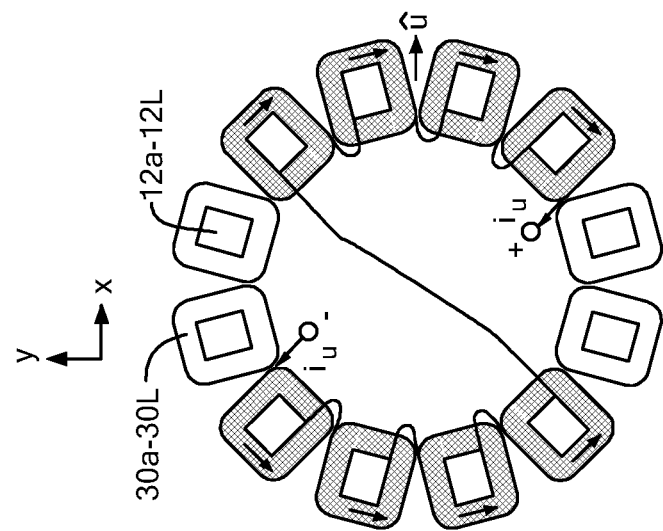

Stator windings comprise rotation winding and suspension windings (e.g., rotation winding 32 and suspension windings 34, 36 of FIG. 6). Here, stator windings comprise stator coils 30a-L (e.g., 36 stator coils in total). The suspension windings comprise coils 34a-L and 36a-L of FIG. 10A. The rotation winding comprises coils 32a-L of FIG. 10B. Referring now to FIGS. 11A, 11B, and 11C showing the winding configuration of the phase U, V, and W, respectively, of the suspension winding. The coils 34a-L and 36a-L, forming the same phase, conduct the same phase current: $i_u$, $i_v$, and $i_w$. The coils 34a-L and 36a-L forming the same phase have the same shading. The positive direction of the phase current is represented with bold arrows.

By applying a balanced three-phase currents, i.e., $i_u = I_s \cos(\theta_s)$ $i_v = I_s \cos(\theta_s - 2\pi/3)$ $i_w = I_s \cos(\theta_s + 2\pi/3);$ the suspension winding can generate radial force whose amplitude is controlled with $I_s$ and direction is controlled with $\theta_s$, where $\theta_s$ is the angle of the radial force with respect to the axis x in FIGS. 11A, 11B, and 11C. Since $i_u + i_v + i_w = 0$, the negative or positive terminals of the three phases can be connected together to form a wye-connected three-phase winding.

Currents through the suspension winding generates two-pole MMF distribution around the rotor. Since the coils in the same phase conducts the same current, the MMF generated by each coil is proportional to the number of turns. Four coils closer to the magnetic axis of the phase, or primary coils, has more number of turns than the others, or secondary coils. There is an optimal turn ratio between the secondary coil $N_2$ and the primary coil $N_1$ to minimize the force coupling between x- and y-axes, which is about $N_2/N_1 = 0.37$. This number is optimal in the sense that the resulting twelve-point MMF sequence has the least total harmonic distortion. For example, the suspension winding can have $N_1 = 140$ and $N_2 = 52$.

As explained above at least in conjunction with FIG. 4, the separation S between the rotor fin and the rotor teeth affects the suspension force generation.

Figure 12A:
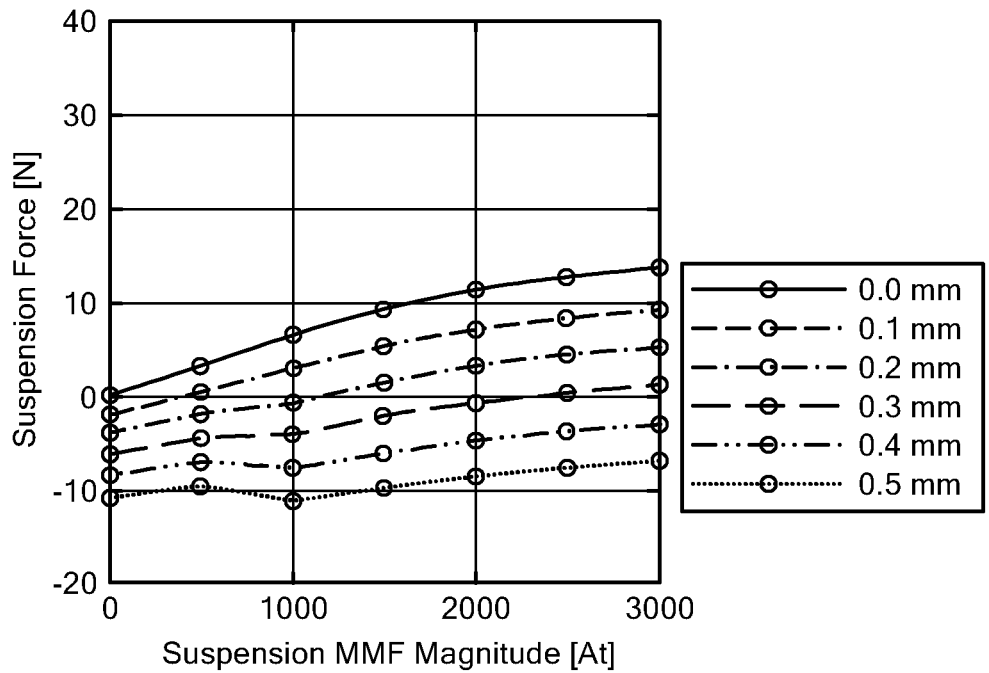
FIGS. 12A-B illustrate graphs of liftoff forces according embodiments described herein.
Figure 12B:
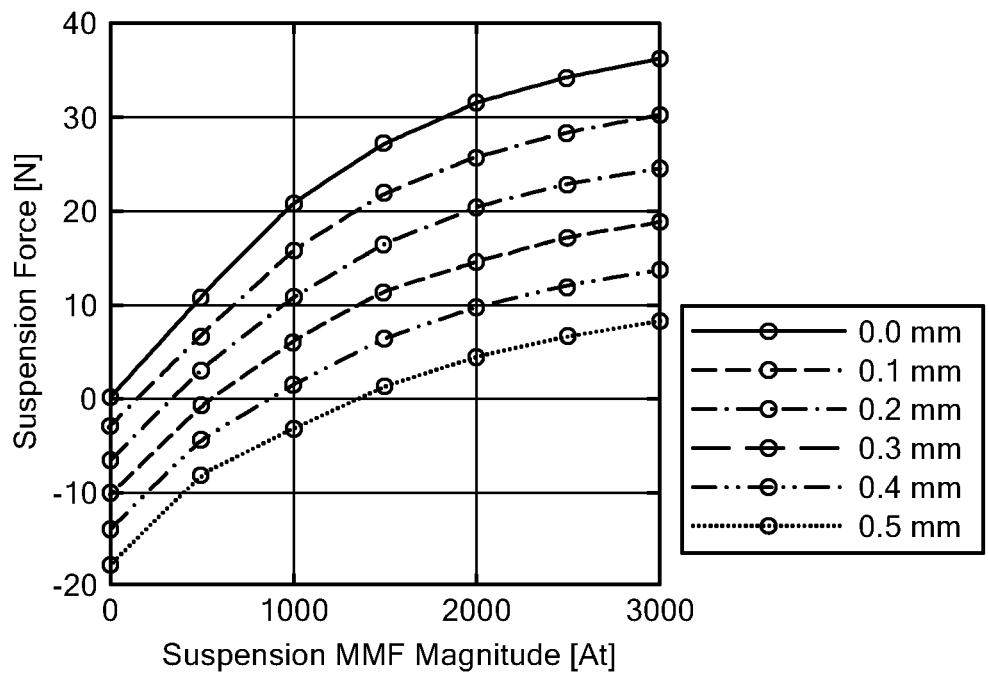

FIGS. 12A and 12B compares the radial suspension force applied to the rotor for two different fin-teeth separation S. Here, FIG. 12A is for S=1.5 mm, and FIG. 12B is for S=3 mm. The data are obtained from the finite-element analysis (FEA) simulations performed using the magnetostatic solver of ANSYS Maxwell software. Here, the horizontal axis is the MMF amplitude $F_s$ and the vertical axis is the radial force along the x'-axis. In the simulation, two-pole MMF is applied toward the positive x'-direction, i.e., $F_s > 0$ and $\theta_s = 0$. For the case with S=1.5 mm, the force curve for a relatively large offset is not monotonically increases with respect to the MMF amplitude. This makes the rotor lift-off impossible because the net radial force cannot reach zero. For the case with S=3 mm, all force curves shown are monotonic with respect to the MMF amplitude. In particular, the force curve for the 0.5 mm radial offset crosses zero at the MMF amplitude of 1300 amp-turns, which shows that rotor lift-off is possible.

Rotation winding generates a rotating eight-pole MMF around the rotor, which interacts with the homopolar bias-flux modulated by the rotor teeth to generate a torque.

The rotation winding comprises wye-connected three phases (A, B, C), where each phase comprises four coils connected in series. The three phases are placed over the stator teeth in a staggered arrangement, as shown in FIG. 10B.

Figures 13A, 13B, 13C:
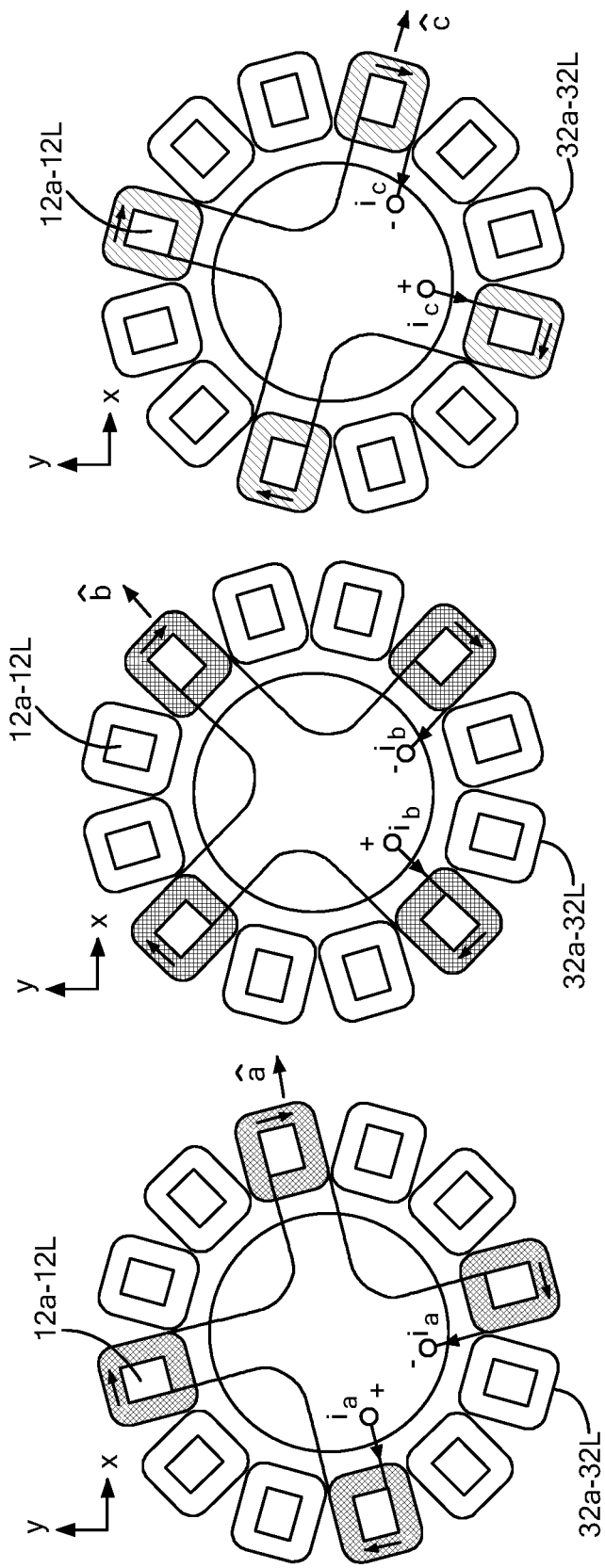
FIGS. 13A-C illustrate rotation winding configurations for phases A, B, and C, respectively, according embodiments described herein.

FIGS. 13A, 13B, and 13C show the winding configuration of the phase A, B, and C and their electrical connections. Here, the coils 32a-L forming the same phase are in the same shading, and conduct the same phase current, $i_a$, $i_b$, and $i_c$, respectively. The positive direction of the phase current is represented with bold arrows. Each coil has a number of turns $N_r=108$.

As explained above at least in conjunction with FIG. 8, the teeth 20a-N of the reluctance rotor 18 are all magnetized to the same pole (here north poles). That is, the homopolar bias flux is focused more on the rotor teeth 20a-N and less on the rotor inter-teeth 81a-N. As the rotor rotates about a z-axis (e.g. an axis going out of the page), each phase sees a time-varying flux linkage. The maximum flux linkage occurs when the phase winding is aligned with the rotor teeth, and the minimum flux linkage occurs when the phase winding is aligned with the rotor inter-teeth. The time-varying flux linkage generates induced voltage, or back EMF, across the phase terminals. This implies that the rotation winding 32a-L can also generate a torque by conducting a current.

The rotation winding 32a-L can generate an eight-pole rotating MMF as excited with a set of balanced three-phase currents:

$$i_a = I_r \cos(\theta_r)$$

$$i_b = I_r \cos(\theta_r - 2\pi/3)$$

$$i_c = I_r \cos(\theta_r + 2\pi/3);$$

Here, $I_r$ is the amplitude of the rotation winding current and $\theta_r$ is the electrical angle of the rotation winding current. The resulting MMF wave has an amplitude $N_r I_r$ and its mechanical angle of rotation is $\varphi_r = \theta_r/p$ with respect to x-axis, where p=4 is the number of pole pairs of the motor MMF. Since $i_a + i_b + i_c = 0$, the negative or positive terminals of three phases can be connected together to form a wye-connected three-phase winding.

Figure 14A:
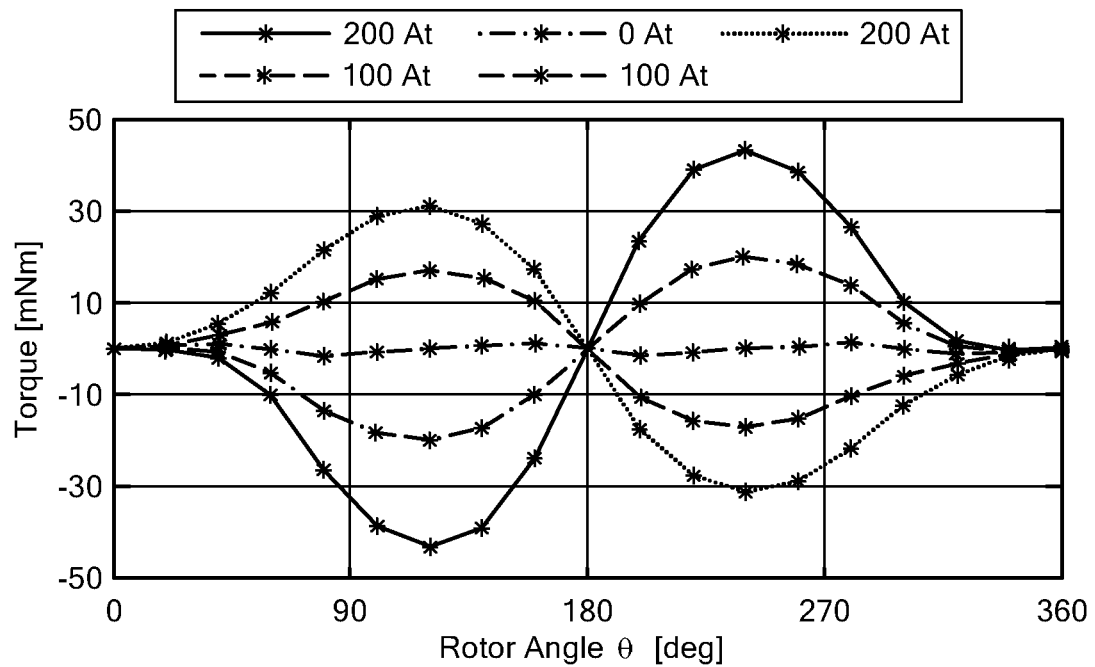
FIGS. 14A-B illustrate graphs of Torque vs. Rotor Angle according embodiments described herein.

Referring now to FIG. 14A, a plot of Torque vs. Rotor Angle illustrates torque on the rotor as computed with FEA simulations. Here, the horizontal axis is the rotor electrical angle $\theta = p\varphi$, where $\varphi$ is the rotor mechanical angle and p=4. The rotation winding MMF angle is set to $\theta_r = 0$ in the simulations. That is, the resulting motor MMF is stationary and only the rotor angle $\theta$ is varied. The rotation winding is excited such that $N_r I_r = \{-200, -100, 0, 100, 200\}$ amp-turns and the rotor angle is varied such that $\theta = (0, 360)$ deg. As explained in Section 2.2, the cogging torque, a torque for zero amp-turns $N_r I_r = 0$, shows negligible variation for the rotor angle $\theta$.

Figure 14B:
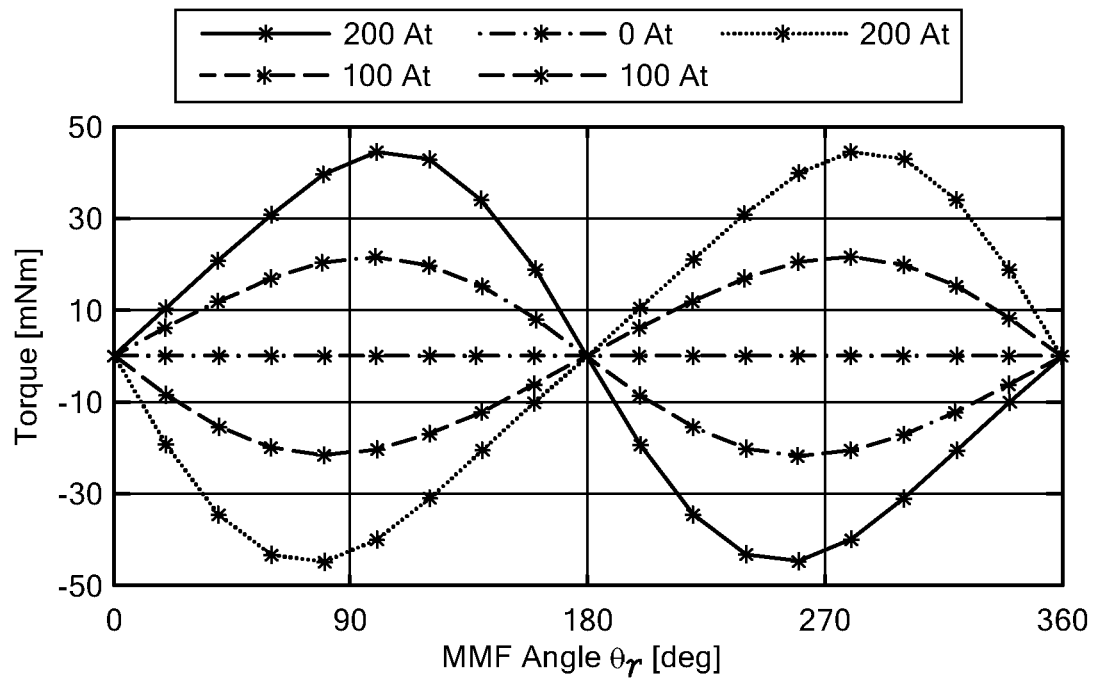

Referring now to FIG. 14B, a plot of Torque vs. MMF Angle illustrates the torque on the rotor as computed with FEA simulations. Here, the horizontal axis is the MMF angle $\theta_r$. The rotor angle is set to $\theta = 0$. That is, the rotor is stationary and only the MMF rotates about z-axis by $\varphi_r = \theta_r/p$. In FEA simulations, the rotation winding is excited such $N_r I_r = \{-200, -100, 0, 100, 200\}$ amp-turns, and the MMF angle is varied such that $\theta_r = (0, 360)$ deg.

The torque generation principle for the reluctance rotors is similar to typical permanent magnet synchronous motors. The torque generation principle for the hysteresis rotors is explained in U.S. patent application Ser. No. 15/227,256 filed Aug. 3, 2016 and assigned to the assignee of the present application.

The bearingless motor described herein forms a closed-loop system with a controller, sensors, and power amplifiers.

Figure 15:
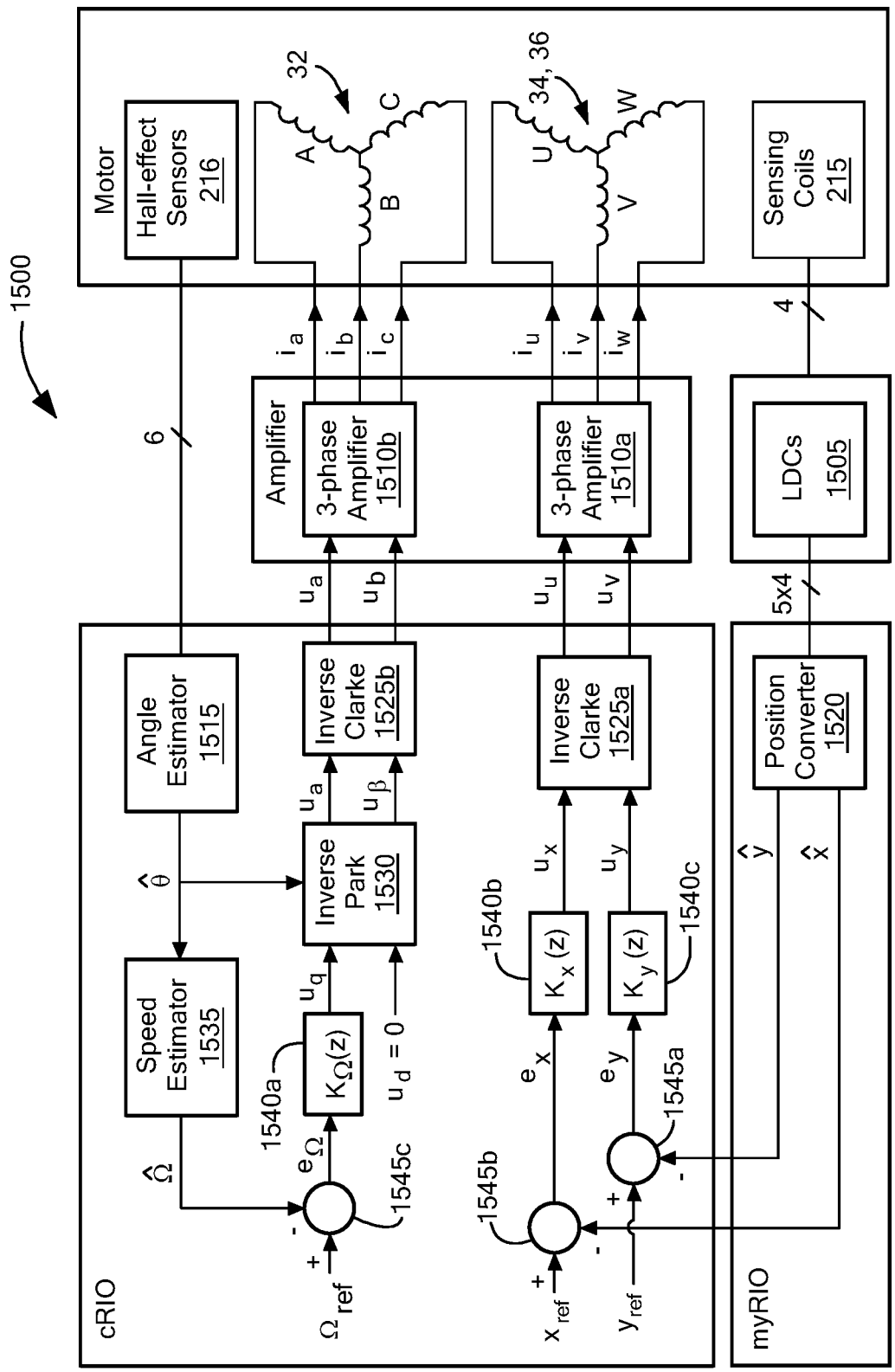
FIG. 15 illustrates a block diagram of an example closed-loop system according embodiments described herein.

Referring now to FIG. 15, shown is a block diagram of an illustrative closed-loop control system 1500. Any real-time controllers that can implement discrete-time control algorithms, such as Compact-RIO targets from National Instruments, can be used. The power amplifiers 1510a-b are configured in transconductance modes, i.e. voltage-controlled-current-sources, where the closed-loop current controls are implemented either using analog circuits or digital algorithms.

The sensors 215 which may be the same as or similar to sensors 21 and 200 described above in conjunction with FIGS. 2A, 2B, embedded in the bearingless motor, send the controller signals that contain information on the rotor radial positions x and y. The sensors 216 send the controller signals that contain information on the rotor angle $\theta$. One illustrative bearingless motor 10 described herein has four eddy-current sensors (n=4) and three Hall affect sensors (m=3) 216 that generate signals containing sufficient information on x, y, and $\varphi$. These signals are sent to the controller and processed by estimation algorithms, i.e., the position converter 1520 and angle estimator 1515 in FIG. 15, to compute the estimates of the rotor radial positions $\hat{x}$ and $\hat{y}$, and rotational angle $\hat{\theta}$. The estimates $\hat{x}$, $\hat{y}$, and $\hat{\theta}$ are sent to discrete-time control algorithms, i.e., the suspension controllers $K_x(z)$ 1540b and $K_y(z)$ 1540c, and rotation controller $K_{106}(z)$ 1540a, which generated signals to control the currents through the suspension winding and rotation winding.

The suspension controllers $K_x(z)$ 1540b and $K_y(z)$ 1540c take error signals $e_x = x_{ref} - \hat{x}$ and $e_y = y_{ref} - \hat{y}$ and generate control efforts $u_x$ and $u_y$, respectively. For example, PD controllers or Lead controllers can be implemented for $K_x(z)$ and $K_y(z)$. The control efforts $u_x$ and $u_y$ are processed via the Inverse Clarke Transformation 1525a to compute three-phase signals $u_u$, $u_v$, and $u_w$ as follows:

$$\begin{bmatrix} u_u \\ u_v \\ u_w \end{bmatrix} = \begin{bmatrix} 1 & 0 \\ -\frac{1}{2} & \frac{\sqrt{3}}{2} \\ -\frac{1}{2} & \frac{\sqrt{3}}{2} \end{bmatrix} \begin{bmatrix} u_x \\ u_y \end{bmatrix}.$$

The signals $u_u$ and $u_v$ are sent to a three-phase transconductance amplifier 1510a as current commands, and the amplifier drives the suspension winding with currents $i_u$, $i_v$, and $i_w$. Excited with $i_u$, $i_v$, and $i_w$, the suspension winding generates two-pole MMF around the rotor, and therefore a radial suspension force.

The rotation control $K_\Omega(z)$ 1540a takes an error signal $e_\Omega = \Omega_{ref} - \hat{\Omega}$ and computes the q-axis control effort $u_q$. For example, a PI controller can be implemented for $K_r(z)$. The d-axis control effort $u_d$ can be set to zero in typical cases, or set to other values if necessary. The two control efforts $u_d$ and $u_q$ are converted to $u_\alpha$ and $u_\beta$ via the Inverse Park Transformation 1530:

$$\begin{bmatrix} u_\alpha \\ u_\beta \end{bmatrix} = \begin{bmatrix} \cos\hat{\theta} & -\sin\hat{\theta} \\ \sin\hat{\theta} & \cos\hat{\theta} \end{bmatrix} \begin{bmatrix} u_d \\ u_q \end{bmatrix}$$

which utilize the estimate of rotor angle $\hat{\theta}$ during the computation. The outputs $u_\alpha$ and $u_\beta$ are sinusoidal signals modulated with $u_d$ and $u_q$ to transform the quantities in a rotating frame to ones in a stationary frame. Then, the Inverse Clarke Transformation 1525b converts $u_\alpha$ and $u_\beta$ to $u_a$, $u_b$, and $u_c$ as follows:

$$\begin{bmatrix} u_a \\ u_b \\ u_c \end{bmatrix} = \begin{bmatrix} 1 & 0 \\ -\frac{1}{2} & \frac{\sqrt{3}}{2} \\ -\frac{1}{2} & \frac{\sqrt{3}}{2} \end{bmatrix} \begin{bmatrix} u_\alpha \\ u_\beta \end{bmatrix}.$$

The signals $u_a$ and $u_b$ are sent to a three-phase transconductance amplifier 1510b as current commands, and the amplifier drives the rotation winding with currents $i_a$, $i_b$, and $i_c$. Excited with $i_a$, $i_b$, and $i_c$, the rotation winding generates.

The rotation controller $K_\Omega(z)$ 1540a and suspension controllers $K_x(z)$ 1540b and $K_y(z)$ 1540c are decoupled in the sense that $K_\Omega(z)$ 1540a does not use $\hat{x}$ and $\hat{y}$ to compute its control efforts, and $K_x(z)$ 1540b and $K_y(z)$ 1540c do not use $\hat{\theta}$ to compute their control efforts. This characteristic is also explained in U.S. patent application Ser. No. 15/227,256 filed Aug. 3, 2016 and assigned to the assignee of the present application.

The feedback control of the subject bearingless motor requires information on the rotor radial positions, $\hat{x}$ and $\hat{y}$, and rotor rotational angle $\hat{\theta}$.

One way of obtaining such information is to use sensors (e.g., sensors 21 of FIG. 2). For example, the rotor radial positions can be directly measured with four eddy-current sensors (e.g., the sensors 21). The eddy-current sensors can be located at the center of the stator to measure the distance to the rotor inner surface. The radial rotor positions $\hat{x}$ and $\hat{y}$ can be computed by taking differential outputs of the two pairs of diametrically-opposing sensors. Eddy-current sensors can be also placed between the stator teeth to measure the rotor outer surface. In this case, the rotor needs to be encapsulated with thin-walled metal to provide a cylindrical target surface to the sensors. Alternatively, one can use an array of Hall-effect sensors to measure the variation of the homopolar-bias flux density with respect to the rotor radial positions. Position sensors of other kinds, such as inductive, capacitive, and optical sensors, can be used as well. The rotational angle of the rotor can be computed using the Hall-sensor outputs, as in typical permanent-magnet synchronous motors. In other embodiments, the radial positions can be directly measured with a sensing coil module (e.g., the sensing coil module 200 of FIG. 2B).

Alternatively, the information on $\hat{x}$, $\hat{y}$, and $\hat{\theta}$ can be indirectly obtained via estimation algorithms. For example, angle estimate $\hat{\theta}$ can be computed using an observer based on the measurements of the phase voltages and currents.

Figure 16:
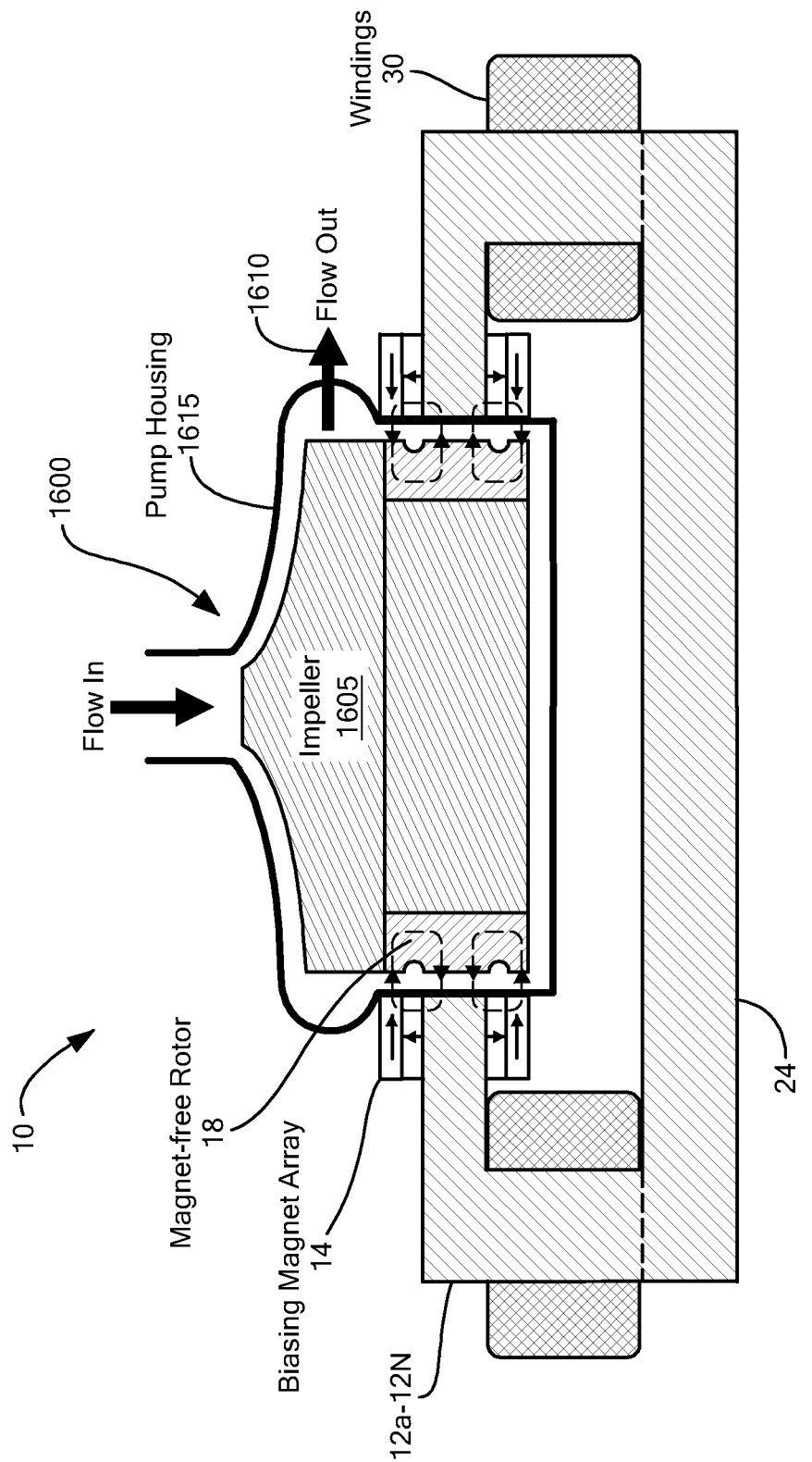
FIG. 16 illustrates a design of a centrifugal pump integrated with a bearingless motor according embodiments described herein.
Figure 17:
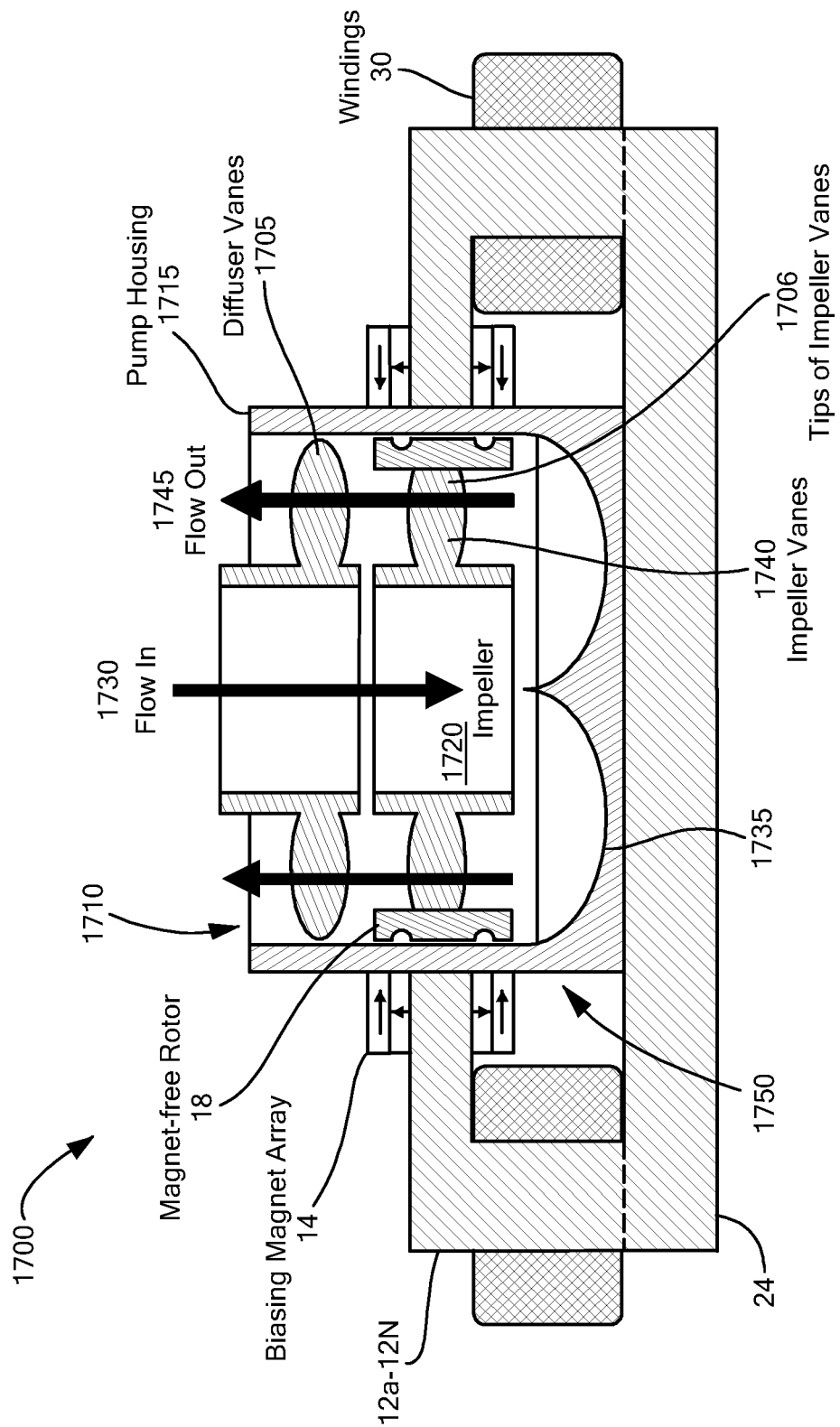
FIG. 17 illustrates an axial-flow pump integrated with a bearingless motor according embodiments described herein.

The bearingless motor design described herein can be utilized to develop bearingless pumps, as shown in FIGS. 16 and 17. Here, the magnet-free rotor of the subject bearingless motor is attached to the pump impeller. The impeller-rotor assembly is then encapsulated by the pump housing. As the stator levitates and rotates the rotor, the attached impeller drives the fluid from the inlet to the outlet. The internal geometry of the pump housing guides the flow path. The fluid is only contained inside the pump housing, and does not make contact with the stator.

Referring now to FIG. 16, shown is the design of a centrifugal pump 1600 integrated with the bearingless motor 10 described herein. Not shown in the FIG. 16, but the impeller 1605 has multiple vanes that radially pushes a liquid as the impeller 1605 rotates. The flow comes down into the center of the impeller and goes radially outwards to the outlet 1610. The pump housing 1615 can either have a single spiral volute or multiple diffuser vanes, both of which increase the outlet pressure by decreasing the fluid velocity.

Referring now to FIG. 17, shown is an axial-flow pump 1700 integrated with the subject bearingless motor 10. Here, diffuser vanes 1705 are connected to a cylindrical shell 1710 that is rigidly connected to the pump housing 1715, although the connection is not shown in the figure. An impeller 1720 of the pump 1700 has multiple vanes that axially pushes a liquid as the impeller rotates. The tips 1706 of the impeller vanes are connected to the magnet-free rotor. In operation, the impeller-rotor assembly is magnetically levitated and rotated in the pump housing 1715. The flow enters the pump via the inlet 1730 located at the center, reverts its direction against the curved surface 1735 of the impeller housing bottom, gains momentum as being pushed by the impeller vanes 1740, and goes through diffuser vanes 1705 and exits the pump. A central conduit, comprising central through-holes of diffuser 1705 and impeller 1720, and an outer annular conduit 1745, where the impeller vanes 1740 and diffuser vanes 1705 are located, form a co-axis flow path. This co-axial pump design is suitable to make an integrated pump-oxygenator unit. An oxygenation chamber (not shown) can be directly attached to the annular outlet 1745 to make the pump-oxygenator as a single unit. With this design, the pump-oxygenator unit can be easily mounted into and dismounted from a stator bore 1750 without changing the fluidic circuit connections.

All publications and references cited herein are expressly incorporated herein by reference in their entirety.

What is claimed is:

1. A homopolar bearingless slice motor comprising:
    a stator comprising a stator armature and a stator winding, the stator armature having a plurality of stator teeth and the stator winding comprising a plurality of coils;
    an array of permanent magnets disposed on the stator teeth; and
    a magnet-free rotor comprising one or more salient features, wherein the one or more salient features comprise:
        a first radial fin projecting radially outward from a top surface of the magnet-free rotor, and a second radial fin projecting radially outward from a bottom surface of the magnet-free rotor, wherein the first and second radial fins are axisymmetric with respect to a rotational axis of the rotor and are continuous around the circumference of the rotor; and
        a plurality of rotor teeth distributed along a circumference of the magnet-free rotor and disposed on an outer surface of the magnet-free rotor and between the first and second radial fins of the magnet-free rotor.

2. The homopolar bearingless slice motor of claim 1 wherein the permanent magnet array provides homopolar bias flux to the rotor and the one or more salient features route the bias flux toward one or more desired paths for force and torque generation.

3. The homopolar bearingless slice motor of claim 2 wherein the array of permanent magnets comprises two magnet arrays, and the two magnet arrays are placed at the tips of stator teeth to provide the bias flux via relatively short flux paths.

4. The homopolar bearingless slice motor of claim 3 wherein in response to modulating currents through the stator winding based on rotor radial and angular position measurements, the stator is configured to levitate and rotate the rotor.

5. The homopolar bearingless slice motor of claim 1 wherein the array of permanent magnets is arranged in a Halbach array configuration and disposed around and proximate to the outer surface of the magnet-free rotor.

6. The homopolar bearingless slice motor of claim 1 wherein the salient features comprise one or more of:
one or more members provided on a side surface of a rotor;
and
a magnetic material disposed around a side surface of the rotor between the radial fins.

7. The homopolar bearingless slice motor of claim 1 wherein the stator has a rotation winding and a suspension winding, where the rotation winding and suspension winding are physically separate windings, thereby reducing a required number of power amplifiers.

8. The homopolar bearingless slice motor of claim 1 wherein a width of each rotor tooth spans a circumferential length of the rotor to cover about two stator teeth.

9. A homopolar bearingless slice motor comprising:
a magnet-free rotor comprising one or more salient features, the one or more salient features comprising:
a first radial fin projecting radially outward from a top surface of the magnet-free rotor, and a second radial fin projecting radially outward from a bottom surface of the magnet-free rotor, wherein the first and second radial fins are axisymmetric with respect to a rotational axis of the rotor and are continuous around the circumference of the rotor; and
a plurality of rotor teeth distributed along a circumference of the magnet-free rotor and disposed on an outer surface of the magnet-free rotor and between the first and second radial fins of the magnet-free rotor.

10. The homopolar bearingless slice motor of claim 9 further comprising:
a stator comprising a stator armature and a stator winding, the stator armature having a plurality of stator teeth and the stator winding comprising a plurality of coils; and
an array of permanent magnets disposed on the stator teeth.

11. The homopolar bearingless slice motor of claim 10 wherein the permanent magnet array provides homopolar bias flux to the rotor and the one or more salient features route the bias flux toward one or more desired paths for force and torque generation.

12. The homopolar bearingless slice motor of claim 11 wherein the array of permanent magnets comprises two magnet arrays, and the two magnet arrays are placed at the tips of stator teeth to provide the bias flux via relatively short flux paths.

13. The homopolar bearingless slice motor of claim 12 wherein in response to modulating currents through the stator winding based on rotor position measurements, the stator is configured to levitate and rotate the rotor.

14. The homopolar bearingless slice motor of claim 10 wherein the array of permanent magnets is arranged in a Halbach array configuration and located around an outer surface of the magnet-free rotor.

15. The homopolar bearingless slice motor of claim 10 wherein the salient features comprise one or more of:
one or more members provided on a side surface of a rotor;
and
a magnetic material disposed around a side surface of the rotor between the radial fins.

16. The homopolar bearingless slice motor of claim 10 wherein the stator has a rotation winding and a suspension winding, where the rotation winding and suspension winding are physically separate windings, thereby reducing a required number of power amplifiers.

17. The homopolar bearingless slice motor of claim 9 wherein a width of each rotor tooth spans a circumferential length of the rotor to cover about two stator teeth.

18. A method of operating a homopolar bearingless slice motor, the method comprising:
rotating a magnet-free rotor comprising one or more salient features within a stator bore defined by a stator armature having a plurality of stator teeth, wherein the one or more salient features comprise:
a first radial fin projecting radially outward from a top surface of the magnet-free rotor, and a second radial fin projecting radially outward from a bottom surface of the magnet-free rotor, wherein the first and second radial fins are axisymmetric with respect to a rotational axis of the rotor and are continuous around the circumference of the rotor; and
a plurality of rotor teeth equally distributed along a circumference of the magnet-free rotor and disposed on an outer surface of the magnet-free rotor and between the first and second radial fins of the magnet-free rotor.

19. The homopolar bearingless slice motor of claim 3, wherein a first one of the two magnet arrays is circularly disposed on a top surface of the tips of the stator teeth, and a second one of the two magnet arrays is circularly disposed on a bottom surface of the tips of the stator teeth, wherein the first and the second magnet arrays are symmetric with respect to a midplane of the tips of the stator teeth.

20. The homopolar bearingless slice motor of claim 1 wherein:
a first set of magnets of the array of permanent magnets is disposed closer to the stator teeth relative to a second set of magnets of the array of permanent magnets;
the first set of magnets is axially magnetized, and the second set of magnets is radially magnetized; and
the array of permanent magnets is configured to produce homopolar flux distribution in an air gap between the stator teeth and the rotor teeth.

21. The homopolar bearingless slice motor of claim 12, wherein a first one of the two magnet arrays is circularly disposed on a top surface of the tips of the stator teeth, and a second one of the two magnet arrays is circularly disposed on a bottom surface of the tips of the stator teeth, wherein the first and the second magnet arrays are symmetric with respect to a midplane of the tips of the stator teeth.

22. The homopolar bearingless slice motor of claim 10 wherein:
a first set of magnets of the array of permanent magnets is disposed closer to the stator teeth relative to a second set of magnets of the array of permanent magnets;
the first set of magnets is axially magnetized, and the second set of magnets is radially magnetized; and
the array of permanent magnets is configured to produce homopolar flux distribution in an air gap between the stator teeth and the rotor teeth.

* * * * *